United States Patent

Ikeda et al.

[11] Patent Number: 6,152,776
[45] Date of Patent: Nov. 28, 2000

[54] CONNECTING PLATE FOR A BATTERY HOLDER

[75] Inventors: Tomohiro Ikeda, Shizuoka; Yasuyoshi Fukao, Aichi, both of Japan

[73] Assignee: Yazaki Corporation, Tokyo, Japan

[21] Appl. No.: 09/170,204

[22] Filed: Oct. 13, 1998

[30] Foreign Application Priority Data

Oct. 13, 1997 [JP] Japan ................................. 9-279258

[51] Int. Cl.⁷ ................................................. H01R 33/00
[52] U.S. Cl. ........................... 439/627; 439/500; 439/722; 439/733.1; 429/121; 429/158; 429/123
[58] Field of Search .................................. 439/627, 500, 439/722, 733.1; 429/121, 123, 158

[56] References Cited

U.S. PATENT DOCUMENTS

| 1,215,004 | 2/1917 | Decker | 429/121 |
| 2,995,614 | 8/1961 | Krueger | 429/158 |
| 3,339,169 | 8/1967 | Freeland | 439/627 |
| 4,920,019 | 4/1990 | Stoklosa et al. | 429/122 |
| 5,378,552 | 1/1995 | Dixon, Jr. | 429/91 |
| 5,447,808 | 9/1995 | Molyneux | 429/158 |
| 5,466,974 | 11/1995 | Sutrina et al. | 307/38 |
| 5,643,693 | 7/1997 | Hill et al. | 429/121 |
| 5,948,559 | 9/1999 | Snyder | 439/627 |

FOREIGN PATENT DOCUMENTS

| 0 892 450 A2 | 1/1999 | European Pat. Off. . | |
| 0515051 | 9/1931 | Germany | 439/627 |

*Primary Examiner*—Paula Bradley
*Assistant Examiner*—Tho D. Ta
*Attorney, Agent, or Firm*—Sughrue, Mion, Zinn, Macpeak & Seas, PLLC

[57] ABSTRACT

A connecting plate has: bus bars which connect a plurality of batteries; a voltage-detection terminal unit which is connected to be overlapped to the bus bars and through which a voltage of a desired one of the batteries is detected; an electric wire connected to the voltage-detection terminal unit; and a molded resin board to which these components are integrally fixed. In the voltage-detection terminal unit, a device mounting portion onto which a circuit protecting device is to be mounted is integrally formed between an overlap contact portion opposed to the bus bar, and an electric wire connecting portion. The device mounting portion is exposed to the outside through a device mounting window which is opened in the molded resin board, a circuit protecting device mounted onto the device mounting portion is housed in the device mounting window, and slits are formed around the device mounting window in the molded resin board.

9 Claims, 27 Drawing Sheets

$(A_1 \sim A_n)$

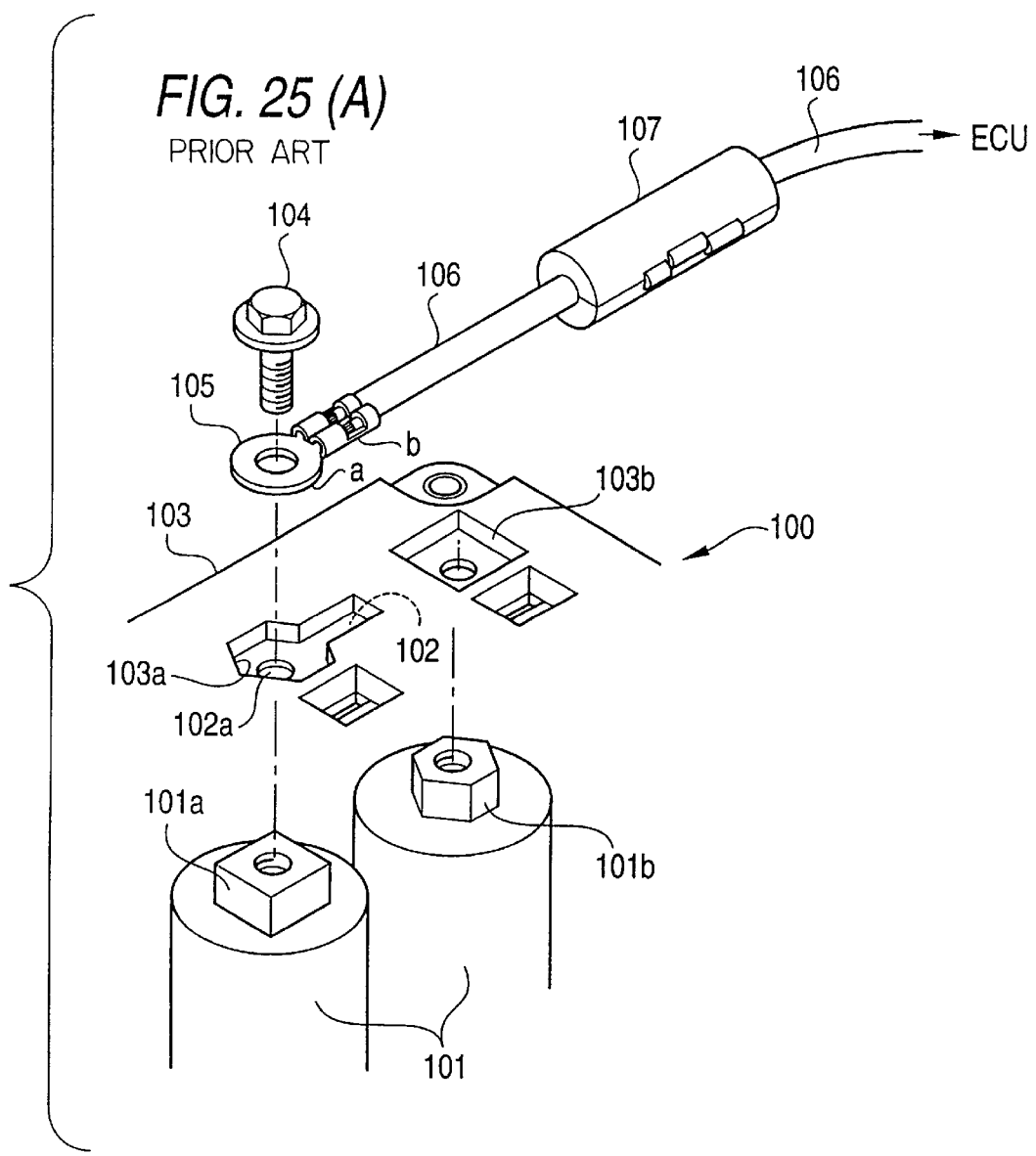
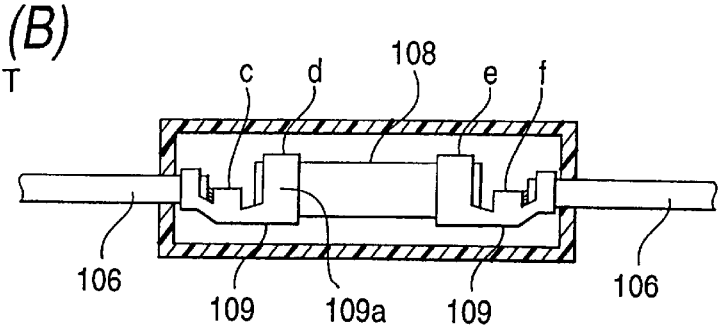

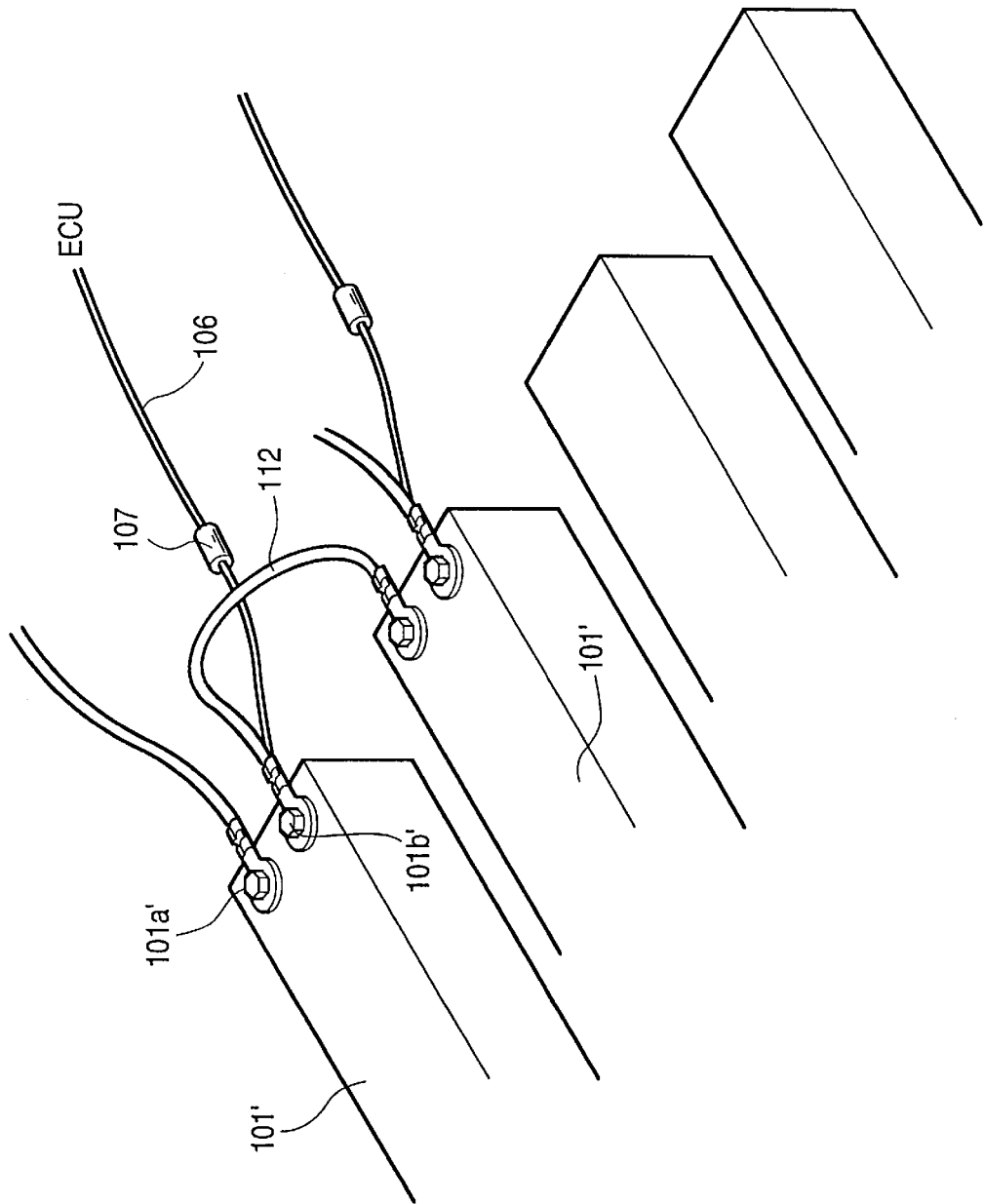

CONNECTING PLATE FOR A BATTERY HOLDER

BACKGROUND OF THE INVENTION

1. Field of the Invention

The present invention relates to a connecting plate which is used with being mounted onto a battery holder housing a large number of cylindrical batteries for an electric vehicle or the like.

The present application is based on Japanese Patent Application No. Hei. 9-279258, which is incorporated herein by reference.

2. Description of the Related Art

As a member for connecting plural batteries in series or in parallel, conventionally, a connecting plate 100 shown in FIGS. 25(A) and 25(B) is proposed.

The connecting plate 100 comprises a molded resin board 103 and bus bars 102 which are integrally molded with a resin. The bus bars 102 respectively connect to two batteries 101. In the molded resin board 103, a hexagonal window 103a and a rectangular window 103b through which electrode holes 102a at the ends of the batteries 101 are exposed are formed. The two batteries 101 are connected to each other by fastening the bus bars 102 respectively to nut-shaped positive and negative electrodes 101a and 101b by bolts 104. Also, a ring terminal 105 partially constituting a voltage detection circuit is connected to one of the windows or the hexagonal window 103a. A fuse case 107 is connected in series to the other end side of an electric wire 106 which is connected at one end to the ring terminal 105. The other end of the electric wire is connected to an Electronic Control Unit (ECU) which is not shown. A fuse 108 is housed in the fuse case 107. The ends of the fuse are connected to electrical contact portions 109a of female terminals 109 connected to the electric wire 106, respectively.

FIG. 26 shows another example of a conventional connecting plate.

In the connecting plate 100', plural L-shape bus bars 102' respectively having connecting legs 102b' of different lengths are moldingly fixed by a molded resin board 103. One end of each of the connecting legs 102b' protrudes from one side edge of the molded resin board 103. Ends on one side of electric wires 106 are welded to the protruding ends, respectively. The other ends of the wires are connected via a fuse case 108' to an ECU which is not shown.

In the fuse case 108', two L-shape pressure contact terminals 111 are opposingly disposed on a case substrate 110. The electric wires 106 are welded to basal plates 111a of the pressure contact terminals 111, respectively. Lead wires 108a' of fuses 108 are connected by pressure contact to slots 111c of pressure contact pieces 111b upstanding from the basal plates 111a, respectively.

The connecting plate 100 of FIG. 25 has many connecting portions in one circuit. In the voltage detection circuit, for example, there are six connecting portions indicated by letters a, b, . . . , and f. The number of parts is large. Therefore, there is a fear that the reliability of electrical connection is impaired. Furthermore, a work of fastening bolts must be conducted while holding respective ring terminals 105 one by one by a hand. As the number of electric wires to be connected is larger, therefore, the works of laying and routing the electric wires become more cumbersome and difficult.

By contrast, in the connecting plate 100' of FIG. 26, the L-shape bus bars 102' of different dimensions are used. Therefore, the plate has difficulties in cost and production management. In the same manner as the connecting plate 100, the number of parts is large and there are many connecting portions in one circuit (five portions a', b', . . . , e'). Moreover, the connecting plate has a problem in that the welding portions between the electric wires 106 and the connecting legs 102b' must be protected.

Furthermore, the electric wires 106 for the connecting plates 100 and 100' are directly connected to the batteries 101, and therefore an adequate protecting structure may be required. However, such protecting structure is complicated since bulky members such as the fuse cases 107 and 108' are attached to the electric wires 106.

FIG. 27 shows a structure in which batteries for an electric vehicle or the like are directly connected to one another without using connecting plates. In each of rectangular batteries 101', the positive and negative electrodes 101a' and 101b' are juxtaposed in one end side. Adjacent batteries are connected to each other by a main power source wire 112. An electric wire 106 (a voltage detection circuit) which has a fuse case 107 in the same manner as FIG. 25 is connected to a required electrode 101b'.

Also in this case, in the same manner as described above, the number of parts is large (the voltage detection circuit). Since the electric wires have many exposed portions, it is dangerous. Furthermore, the main power source wire 112 and the electric wire 106 of the voltage detection circuit intersect with each other, so that the wiring is complicated. This often causes the wiring to be erroneously conducted.

In order to solve these problems, it may be contemplated that, in the connecting plate 100 or 100', the connecting wire 106 is insert-molded in the molded resin board 103, and a fuse 108 or 108' serving as a circuit protecting device is interposed between the bus bar 102 or 102' and the connecting wire 106.

In order to connect the fuse 108 or the like, another terminal must be disposed between the bus bar and the connecting wire. The fuse is permanently connected to the terminals by soldering or the like. Moreover, it is preferable to, when an external force such as an impact or a pressing force is applied to the whole of the connecting plate, prevent stress from propagating to the connection portions.

SUMMARY OF THE INVENTION

The present invention has been conducted in view of the above-discussed problems. An object of the present invention is to provide a connecting plate having a structure in which a bus bar connecting batteries, a voltage-detection terminal unit partially constituting a voltage detection circuit, and the like are integrally insert-molded by a resin, and hence there are a reduced number of exposed portions so as to enhance the safety and facilitate the assembly work, and in which stress hardly propagates to a connecting portion such as soldering.

In order to achieve the object, according to the first aspect of the present invention, there is provided a connecting plate for a battery holder, which comprises: a bus bar connecting a plurality of batteries; a voltage-detection terminal unit, through which voltage of at least a desired one of the batteries is detected, connected to the bus bar, the voltage-detection terminal unit which includes an overlap contact portion which is opposed to the bus bar, an electric wire connecting portion to which an electric wire is connected, and a device mounting portion formed between the overlap contact portion and the electric wire connecting portion; a molded resin board to which the bus bar and the voltage-detection terminal unit are integrally fixed, the molded resin board including a device mounting window through which the device mounting portion is exposed to exterior; and a circuit protecting device attachable onto the device mounting portion through the device mounting window. Accordingly, since the bus bar, the voltage-detection terminal unit connected to the bus bar, the electric wire, and the like are integrally molded with a resin, the connecting plate having a structure in which there are a reduced number of exposed portions, and therefore the safety is enhanced, and the assembly work is facilitated is obtained.

According to the second aspect of the present invention, the connecting plate may further comprise a slit formed at a circumference of the device mounting window which is formed in the molded resin board. Accordingly, even if an external force acts on the connecting plate, stress is scattered, absorbed, or interrupted at the portion of the slit, so that the stress is not applied to a connecting portion such as soldering and a failure of continuity due to a crack or the like does not occur.

According to the third aspect of the present invention, the connecting plate may further comprise a window frame, in place of the slit, formed around the device mounting window to support the device mounting portion. The window frame is preferably insert-molded aside from the molded resin board. Accordingly, an interface is formed between the window frame and the molded resin board. Consequently, even when bending stress or the like acts on the connecting plate, for example, a gap is formed in that portion, thereby suppressing the stress from propagating.

According to the fourth aspect of the present invention, the voltage-detection terminal unit may further include a connection piece formed between the overlap contact portion and the device mounting portion so as to be bent. If the connecting plate comprises the slit, the connection piece is preferably located in the slit. On the other hand, if the connecting plate comprises the window frame, the connection piece is preferably located in an interface portion between the window frame and the molded resin board. Accordingly, since the connection piece which is formed exists between the overlap contact portion and the device mounting portion in the voltage-detection terminal unit, the connection piece has an effect of absorbing stress. In combination of this effect and the effect due to the slits or the interface, the propagation of stress is surely blocked, and therefore the reliability of electrical connection is further improved.

According to the fifth aspect of the present invention instead of the third aspect, the connecting plate may further comprise a window frame formed to define the device mounting window, and in this case, the connecting plate may further comprise a slit formed at a circumference of the window frame.

BRIEF DESCRIPTION OF THE DRAWINGS

FIG. 13(A) is a plan view of a window for mounting a circuit protecting device, FIG. 13(B) is a perspective view of the window, FIG. 13(C) is a section view of the window, and FIG. 13(D) is a section view showing a state in which the circuit protecting device is connected;

FIG. 14(A) is a perspective view of main portions of a primary molded product $P_1$, and FIG. 14(B) is a perspective view of main portions of a secondary molded product $p_2$;

FIG. 15(A) is a perspective view of main portions of upper and lower molds using a rubber mat, and FIG. 15(B) is an exploded perspective view of the main portions;

FIG. 17(A) is a perspective view of main portions of an upper (lower) mold using another rubber mat, and FIG. 17(B) is a section view of the main portions;

FIG. 19(A) is a perspective view showing the secondary molding, and FIG. 19(*b*) is a perspective view showing the final step;

FIG. 22(A) is a perspective view of main portions, and FIG. 22(B) is a section view taken along the line X—X of FIG. 22(A);

FIG. 23(A) is a perspective view of main portions, and FIG. 23(B) is a longitudinal section view;

FIG. 24(A) is a perspective view of a voltage-detection terminal unit 17', and FIGS. 24(B) and 24(C) are longitudinal section views respectively showing states of attaching the terminal to window frames 14' and 14";

FIG. 25(A) is a perspective view showing main portions of an example of a conventional connecting plate for a battery holder;

FIG. 25(B) is a longitudinal section view of a fuse holder shown in FIG. 25(A);

FIG. 27 is a view showing another example of conventional connecting batteries.

DETAILED DESCRIPTION OF THE PREFERRED EMBODIMENTS

Hereinafter, preferred embodiments of the present invention will now be described with reference to FIGS. 1 to 24(C).

Figure 1:
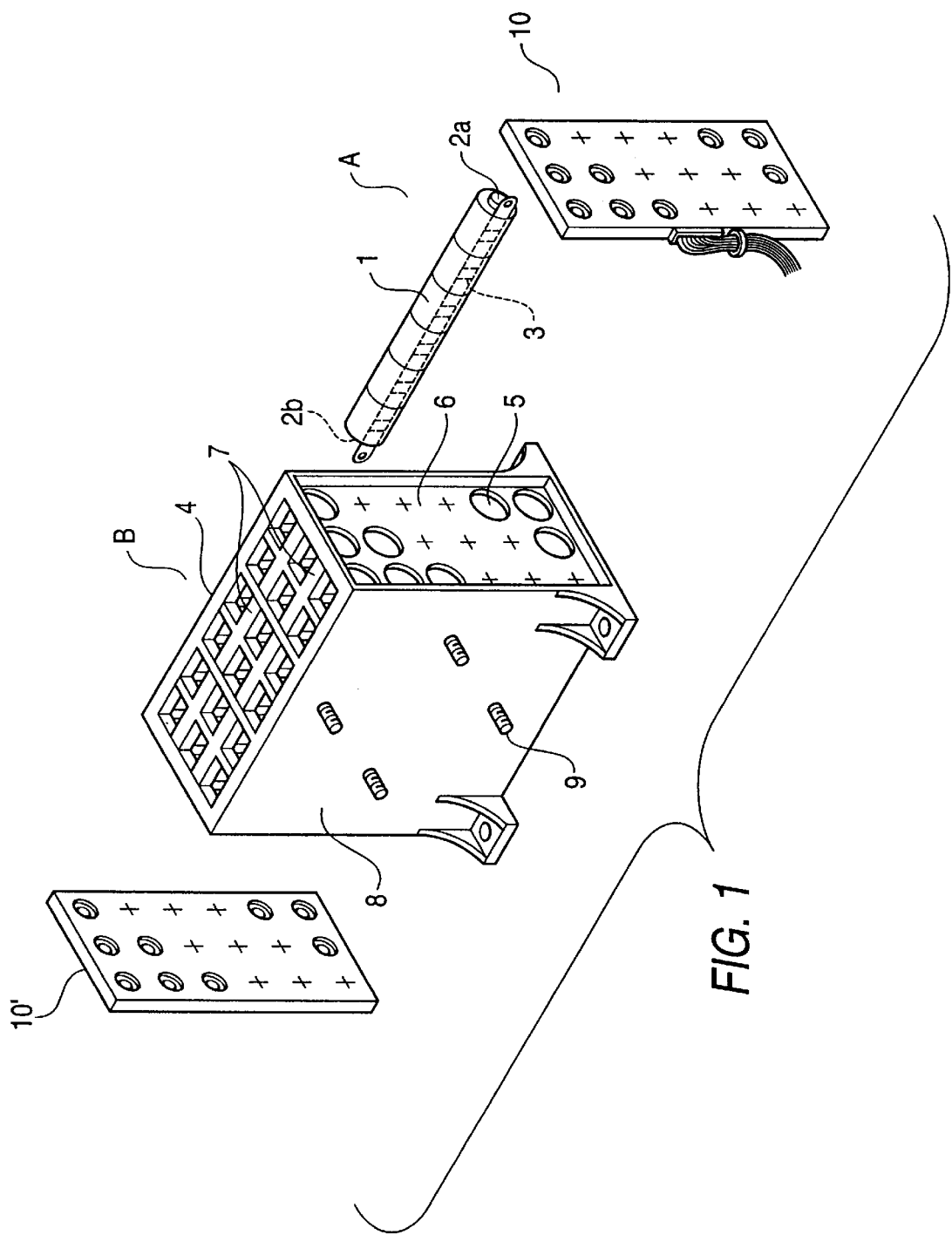
FIG. 1 is a schematic perspective view of a battery holder having a connecting plate for a battery holder which is an embodiment of the present invention.

Referring to FIG. 1, A denotes a long cylindrical battery which is to be used in an electric vehicle or the like, and B denotes a battery holder for housing a large number of batteries A. In each of the batteries A, nut-shaped positive and negative electrodes 2a and 2b having a female thread are disposed at the ends of the body 1, respectively. A Positive Temperature Coefficient (PTC) device 3 is embraced by and fixed to the outer periphery of the body 1 in order to check heat generation of the battery A.

The battery holder B comprises a rectangular frame-like main unit 4, and connecting plates 10 and 10' which are attached to the sides of the main unit, respectively. In the illustrated example, the frame-like main unit 4 has a frame structure in which plural support plates 6 where are arranged in parallel and in a row by using stays 7. In each of the support plates, eighteen battery insertion holes 5 in total are opened in a matrix of 6 holes in vertical and 3 holes in lateral. Plural bolts 9 for fixing the battery holder to the vehicle body are implanted in one side wall 8 extending in the longitudinal direction.

Figure 2:
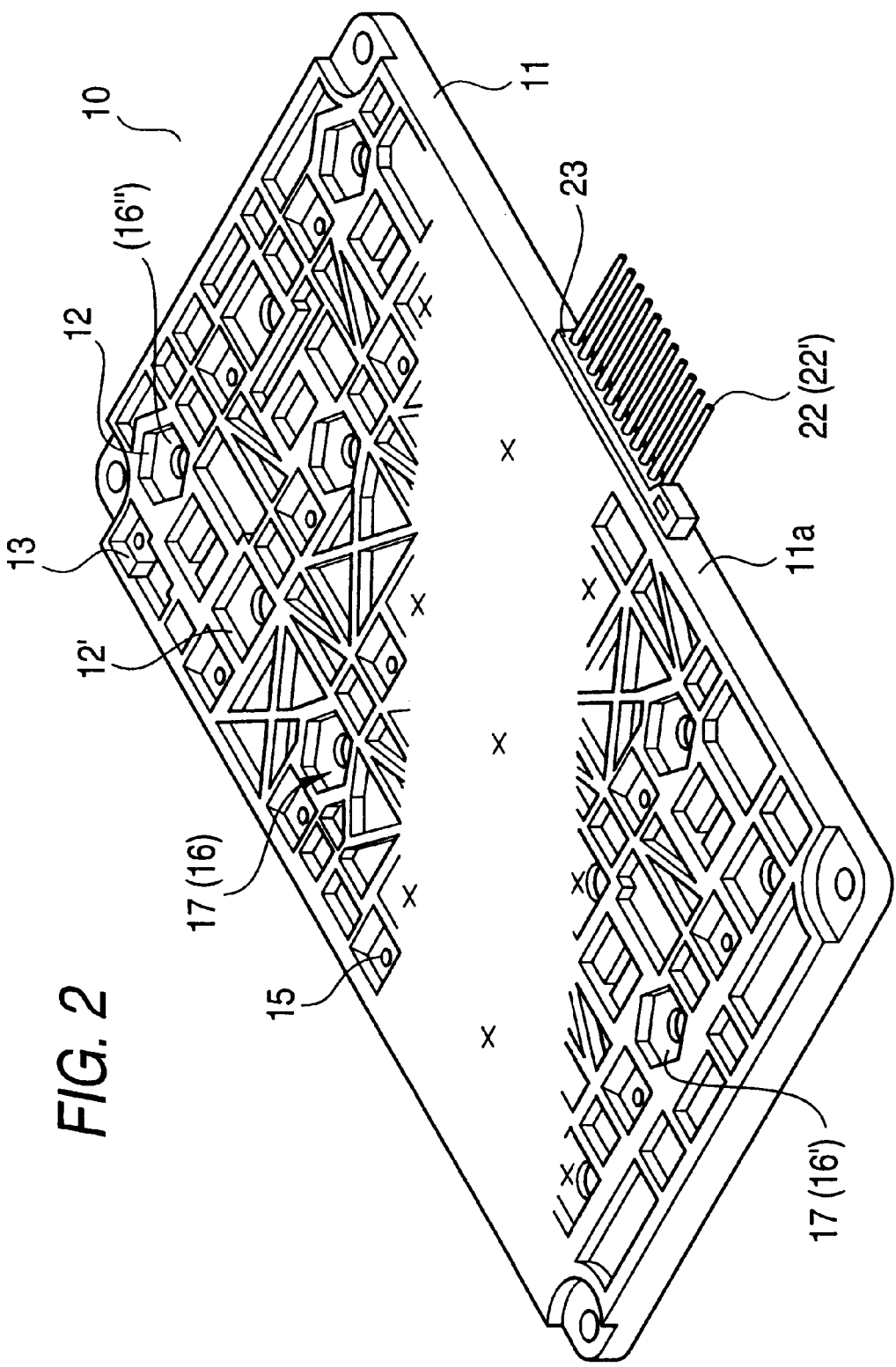
FIG. 2 is a perspective view of the connecting plate for a battery holder of FIG. 1.
Figure 3:
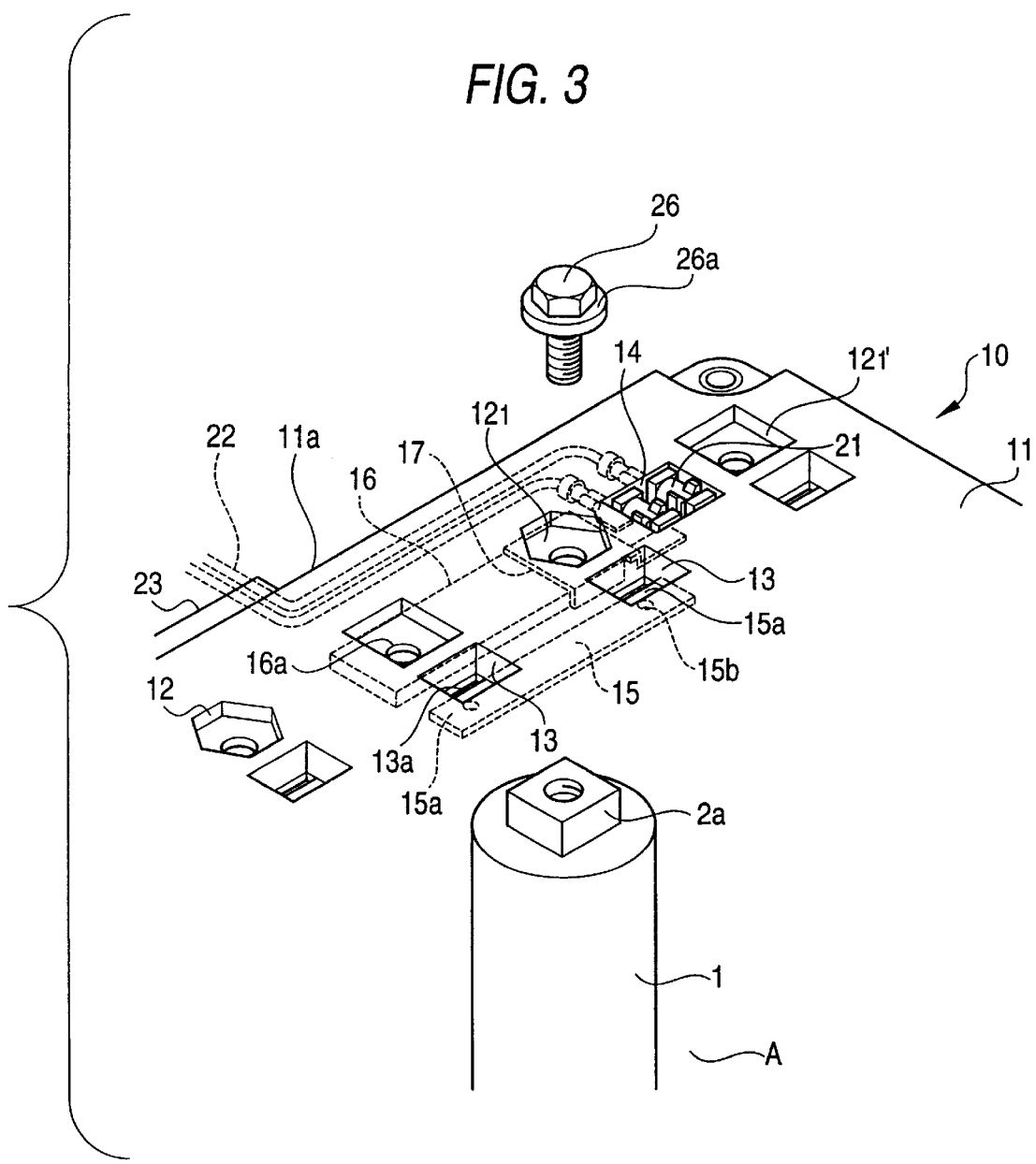
FIG. 3 is an enlarged perspective view of main portions of the connecting plate of FIG. 2.
Figure 4:
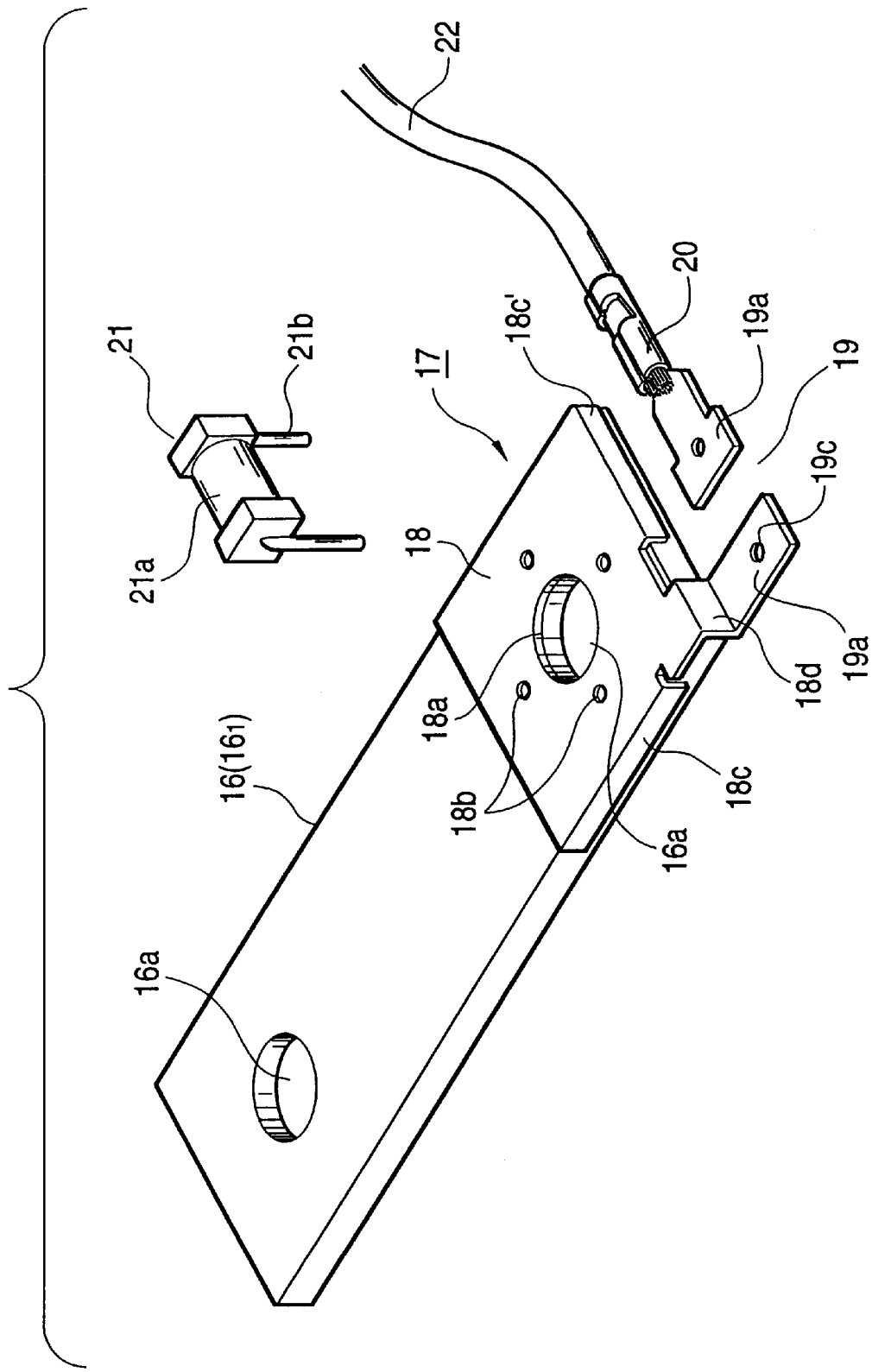
FIG. 4 is an enlarged perspective view showing a connecting state of a bus bar, a voltage-detection terminal unit, and a circuit protecting device which are shown in FIG. 3.

FIG. 2 is a perspective view of the connecting plate 10, FIG. 3 is an enlarged view of main portions of the plate, and FIG. 4 is a perspective view showing a connecting state of a bus bar, a voltage-detection terminal unit, and a circuit protecting device which are shown in FIG. 3.

The connecting plate 10 (10') is configured by inserting and fixing bus bars 16 and 16'(see FIG. 12) connecting the plural batteries, voltage-detection terminal units 17, fuses 21 serving as circuit protecting devices, connecting wires 22, and the like, into a molded resin board 11.

In the molded resin board 11, hexagonal windows 12 and rectangular windows 12' for connecting electrodes are formed in accordance with the arrangement of the plural batteries A. A rectangular window 13 for connecting the PTC device is formed at the side of each of the windows 12 and 12'. Two fuse mounting windows 14 are juxtaposed between desired hexagonal and rectangular windows which are denoted by $12_1$, and $12_1'$. Connecting pieces 15 for connecting the PTC devices 3 in series are embedded between adjacent rectangular windows 13, and connecting end portions 15a at the ends and having a connection hole 15b are exposed through the rectangular windows 13. The fuses 21 are housed in the fuse mounting windows 14, respectively.

Each of the bus bars 16 is formed as a link-like plate member through which a large current can flow. A battery connection hole 16a is formed at each end. The bus bars are arranged at intervals corresponding to the arrangement of the batteries A. The bus bars 16' are formed into a U-like shape so as to connect adjacent batteries A in a vertical row.

Among the plural bus bars 16 (16'), for example, bus bars denoted by $16_1$, are connected to the voltage-detection terminal units 17, respectively.

Each of the voltage-detection terminal units 17 (see FIG. 6) comprises an overlap contact portion 18 opposed to the corresponding bus bar 16, a device mounting portion 19 which is continuous to the overlap contact portion, and a wire connecting portion 20. These portions are integrally formed by punching or bending an electrically conductive metal plate.

The overlap contact portion 18 is formed as a square or rectangular plate member of a size which enables the portion to be substantially overlapped to an end portion of the bus bar 16. A bolt insertion hole 18a having the same diameter as the battery connection hole 16a is formed in a center portion. Plural (in the illustrated example, four) resin leakage inspection holes 18b of a small diameter are formed around the hole 18a. Resin leakage preventing pieces 18c and 18c' which serve also as positioning pieces are downwardly bent and formed in two edges of the overlap contact portion 18 which perpendicularly intersect with each other. When the pieces 18c and 18c' abut against side edges of the end portion of the bus bar 16, the center of the bolt insertion hole 18a is automatically made coincident with that of the battery connection hole 16a.

The device mounting portion 19 is continuously formed via a connection piece 18d which is downward cranked, on the resin leakage preventing piece 18c' which is on one of the two adjacent edges of the overlap contact portion 18. The device mounting portion 19 includes a pair of lead connecting pieces 19a opposed to leads 21b of the ends of the fuse 21, and a connecting piece 19b which integrally holds the two connecting pieces. A lead connection hole 19c is formed in each of the lead connecting pieces 19a. The device mounting portion 19 is made lower in level than the overlap contact portion 18 by the connection piece 18d and one of the lead connecting pieces 19a, and elongates in parallel with the resin leakage preventing piece 18c'. The wire connecting portion 20 is formed continuously with the other lead connecting piece 19a. One end of the insulated wire 22 is connected to a pair of a wire barrel 20a and an insulation barrel 20b of the wire connecting portion 20, by crimping or the like. The other end side of the wire 22 is laid together with the other wires so as to be led out to one side edge 11a of the molded resin board 11. The wires are held at the side edge by a wire holder 23 so as to be arranged at given intervals.

The device mounting portion 19 of the voltage-detection terminal unit 17, i.e., the pair of the lead connecting pieces 19a and the connecting piece 19b are exposed through the fuse mounting window 14 of the molded resin board 11. A pair of fuse engaging arms 24 which have at the upper end a hook-like engaging projection 24a are integrally formed on the inner walls 14a (see FIG. 13) which are on both the sides of the window and sandwich the connecting piece 19b, respectively.

After insert molding of the molded resin board 11, the connecting piece 19b of the device mounting portion 19 is cut away in the fuse mounting window 14. The leads 21b of the ends of the fuse 21 are respectively passed through the lead connection holes 19c of the remaining lead connecting pieces 19a at both the sides, and then applied with solder 25, whereby the fuse 21 is connected and fixed to the voltage-detection terminal unit 17. The fuse 21 the leads of which are passed through the lead connection holes 19c is clamped by the pair of fuse engaging arms 24, and the hook-like engaging projections 24a, thereby preventing the fuse from slipping off. Even when the molded resin board 11 is turned upside down, therefore, the fuse is prevented from falling off. Furthermore, a soldering work can be easily conducted.

Figure 5:
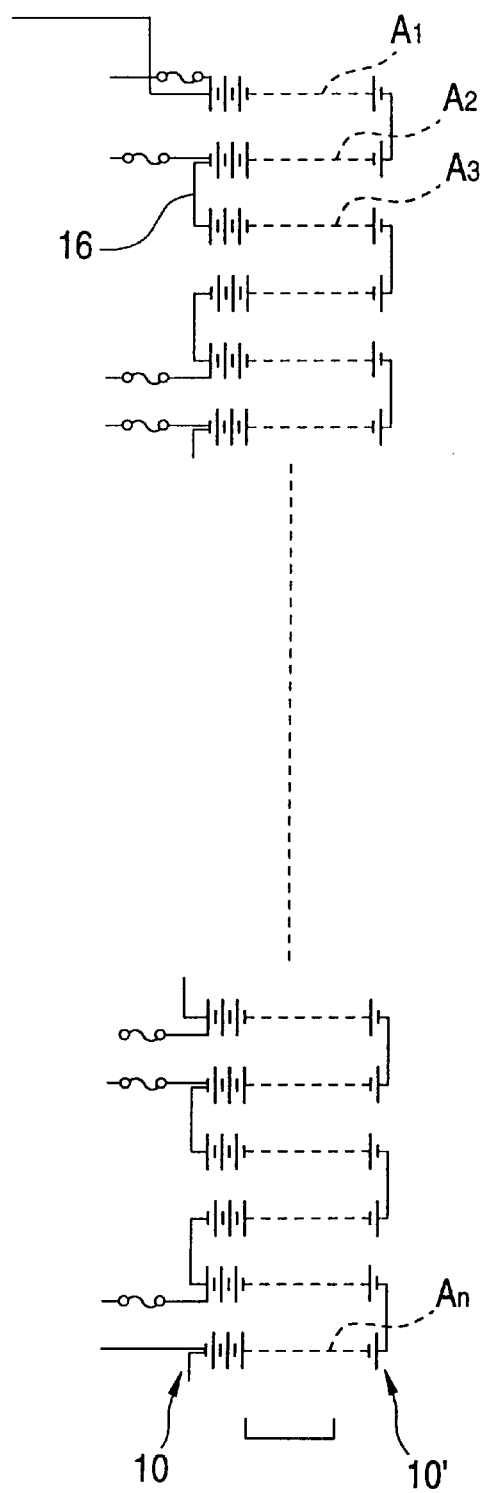
FIG. 5(A) is a circuit diagram showing connections of batteries and voltage-detection terminal units in connecting plates 10 and 10' of FIG. 1.
FIG. 5(B) is a circuit diagram showing connections of PTC devices for detecting heat generation in a battery.
Figure 5:
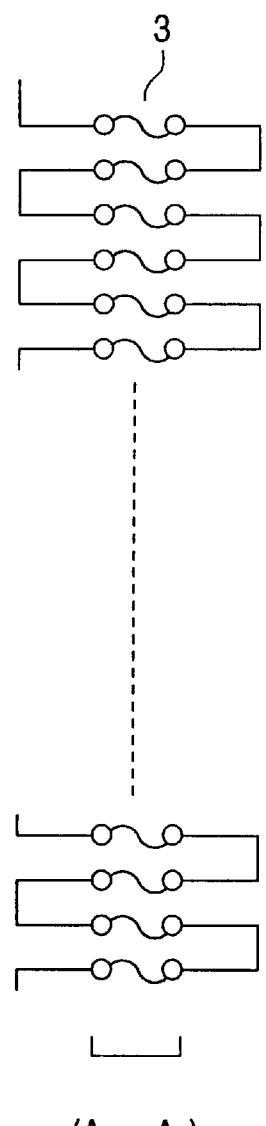

FIG. 5 is a connection diagram in the case where the batteries A are connected in series by using the connecting plates 10 and 10', and FIG. 5(A) shows a voltage detection circuit for the batteries and FIG. 5(B) shows a temperature detection circuit for the batteries.

Returning to FIG. 1, the batteries A are inserted into the battery insertion holes 5 of the battery holder B in such a manner that their positive and negative electrodes 2a and 2b are alternatingly inverted. The connecting plates 10 and 10' are set on the electrodes 2a and 2b protruding from the ends of the holder B, and the ends of the bus bars 16 (16') are alternatingly fastened and fixed to the positive and negative electrodes 2a or 2b of the batteries A by the bolts 26.

As a result, as shown in FIG. 5(A), the batteries $A_1$, $A_2$, $A_3$, ..., $A_n$ are connected in series by the bus bars 16 (16'). The fuses 21 are connected to ends of single-pole bus bars 16" and double-pole bus bars 16 via the voltage-detection terminal units 17. When the wires 22 are connected to an ECU which is not shown, therefore, the voltages of all the batteries A can be always monitored for each sets of two batteries. Batteries A generating an abnormal voltage can be rapidly replaced with other ones in the unit of two batteries.

As described above, the PTC devices 3 are attached to the batteries $A_1$, $A_2$, ..., $A_n$, respectively. The lead wires (not shown) of the both sides of each PTC device are connected to the ends of the connecting piece 15 in the connecting plate 10 (10'). Specifically, screws which are not shown are fastened to the connection holes 15b of the connecting end portions 15a at the ends. On the other hand, the lead wires of the PTC device 3 are led out from through paths 13a formed in one side of the rectangular windows 13. The lead wires are fixed by the screws.

As a result, as shown in FIG. 5(B), all the PTC devices 3 of the batteries $A_1$, $A_2$, ..., $A_n$ are connected in series. When any one of the batteries abnormally generates heat, the resistance of the PTC device 3 corresponding to the battery is suddenly increased, and hence the check circuit is opened.

In this way, the embodiment has a structure in which an abnormal voltage and abnormal heat generation of the batteries A in the batter holder B are always monitored.

Next, a method of producing the connecting plate 10 (10') will be described with reference to FIGS. 6 to 13.

First, the insulated wires 22 which are to be connected to the voltage-detection terminal units 17 of the connecting plate 10 are prepared. For the convenience of maintenance and the like, preferably, different colors or markers such as a pattern, a stripe, or a symbol are applied to the insulating coating of the wires 22. The wires are cut into a predetermined length and the coating at each end is peeled off.

Figure 6:
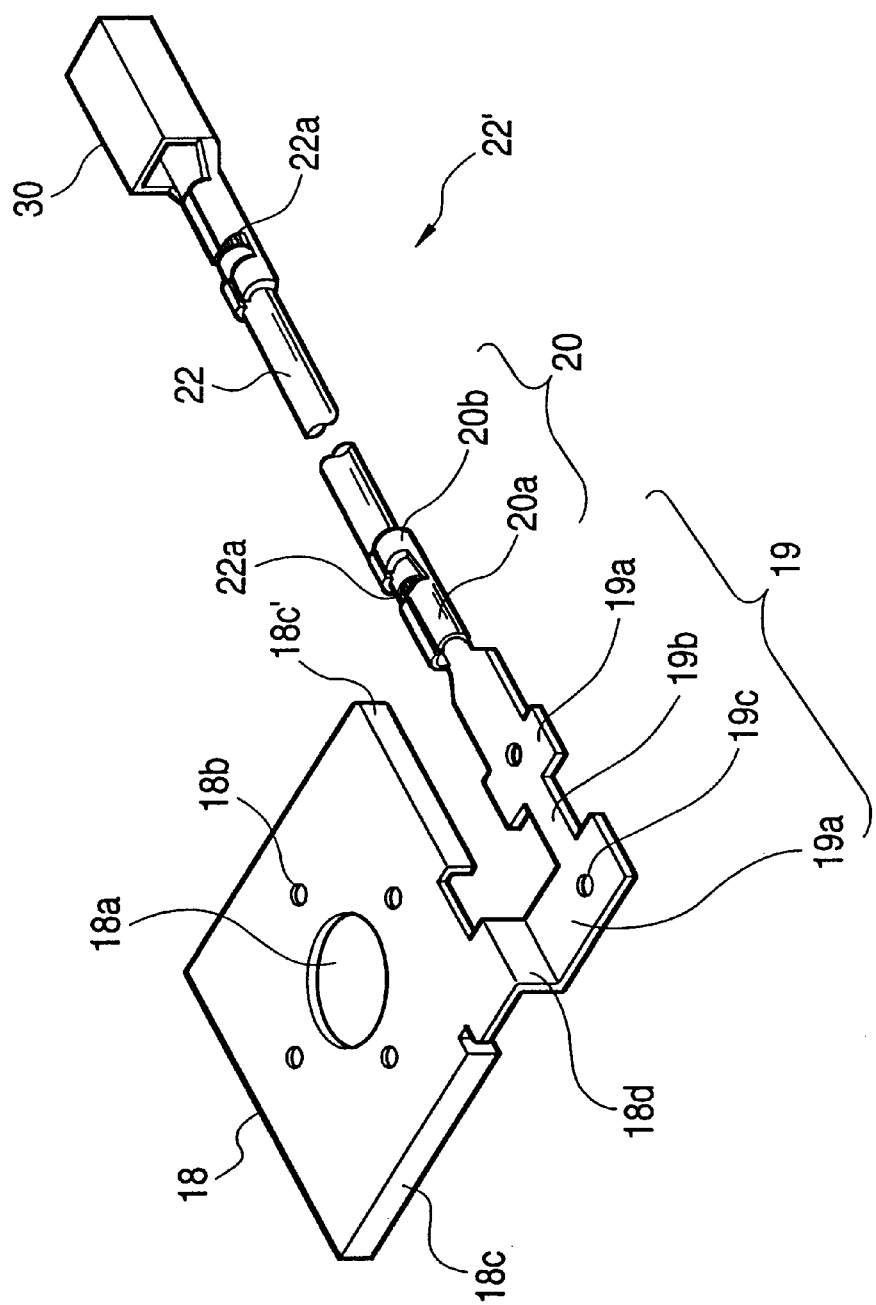
FIG. 6 is a view illustrating a production step (pretreatment step) of the connecting plate for a battery holder of FIG. 1.

Next, as shown in FIG. 6, the exposed core wire 22a at one end is connected to the wire connecting portion 20 of the voltage-detection terminal unit 17, and a female (or male) connector terminal 30 is connected to the other end, thereby producing a terminal-equipped wire 22'.

Figure 7:
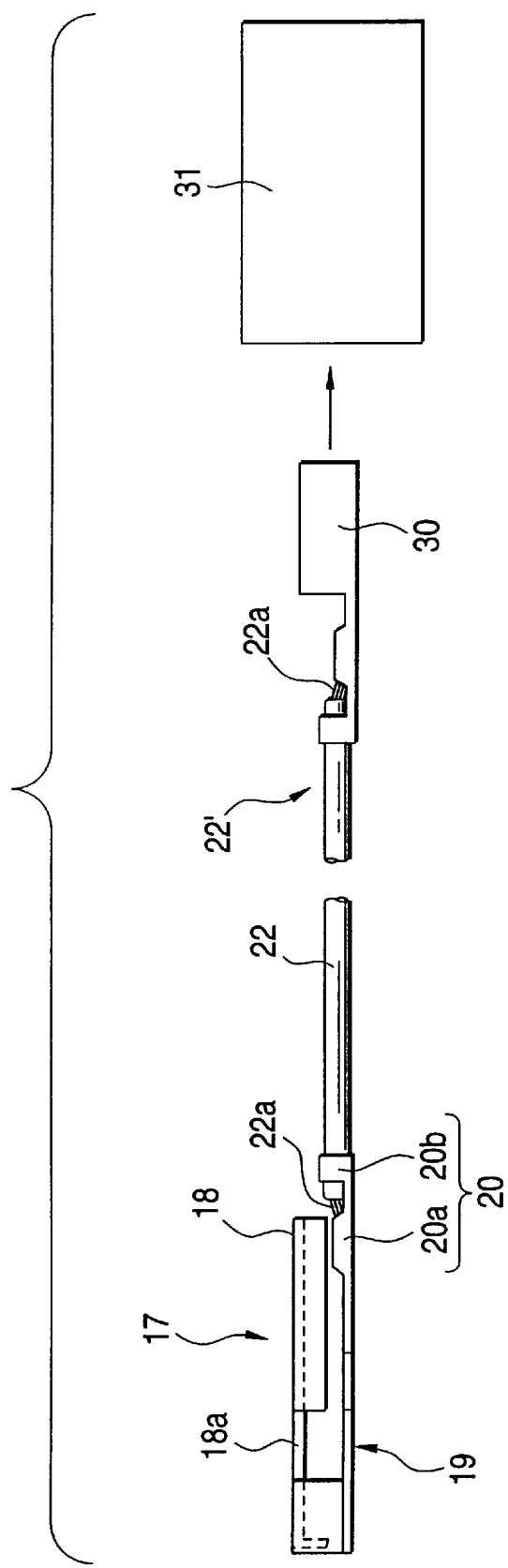
FIG. 7 is a view illustrating a production step (connection of terminals and fitting to case) subsequent to that of FIG. 6.

As shown in FIG. 7, the connector terminals 30 of the thus prepared terminal-equipped wires 22' are then inserted into and engaged with a terminal chamber (not shown) of a connector (housing) 31. The engaging structure between the connector terminals and the terminal chamber may be formed in accordance with known means, and hence its illustration is omitted.

Figure 8:
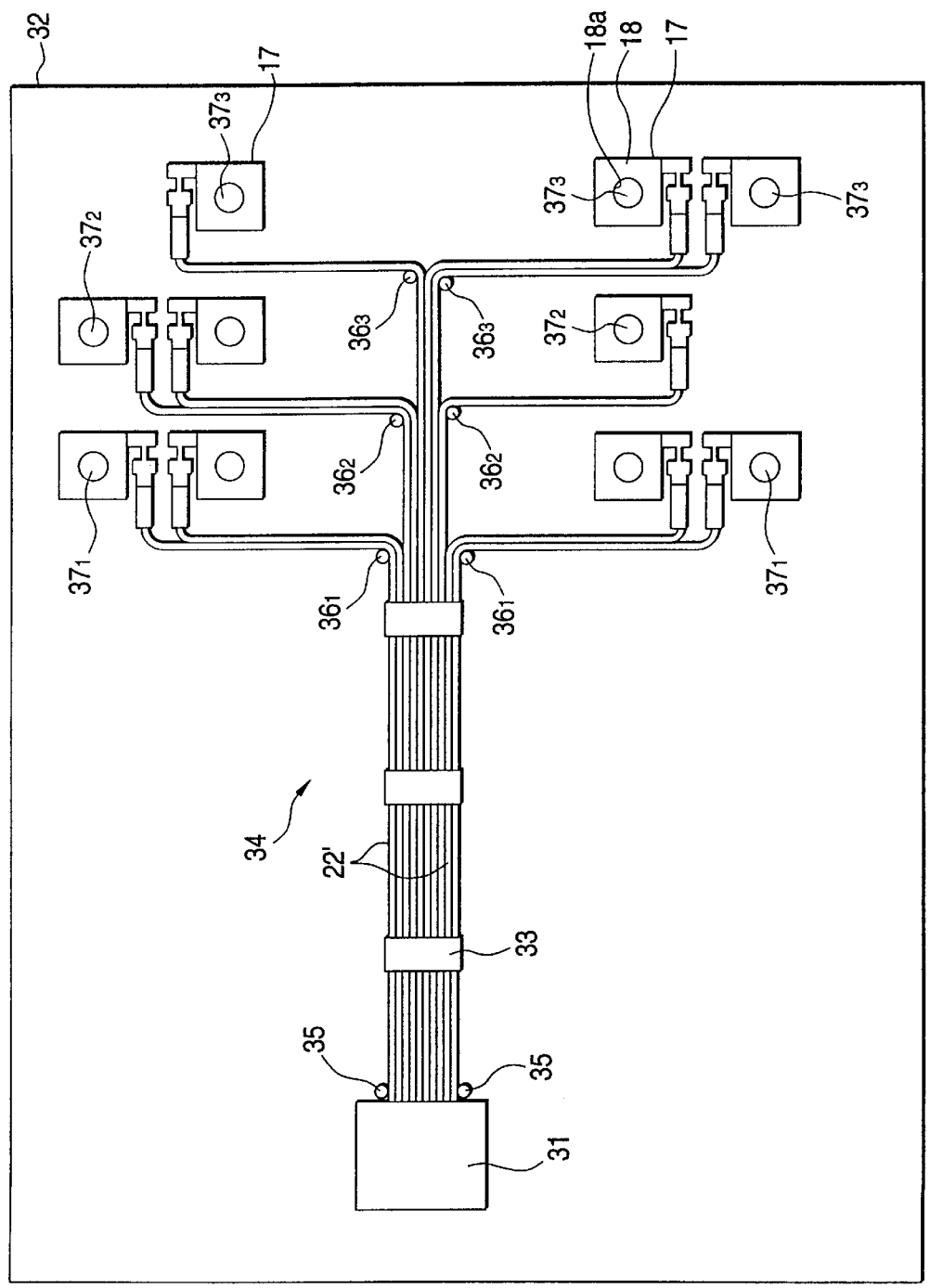
FIG. 8 is a view illustrating a production step (a step of wiring a harness for a plate) subsequent to that of FIG. 7.

Next, as shown in FIG. 8, the voltage-detection terminal units 17 of the terminal-equipped wires 22' are arranged on a wiring table 32 in accordance with the arrangement positions of the bus bars 16 (16') to which the terminal-equipped wires are connected to be overlapped. The wires 22' connected to the voltage-detection terminal units 17 are laid so as to be combined in a center portion of the molded resin board 11, in order to lead out the wires from one side edge of the board. The wires are combined into a flat shape by tapes 33 to form a harness 34 for a plate.

The above will be described in more specifically. In the battery holder B of FIG. 1, the number and positions of the battery insertion holes 5 of the support plate 6 are predetermined, and hence also the layout of the bus bars 16 and 16' in the connecting plate 10 is uniquely determined. In accordance with the layout, therefore, a pair of connector engaging pins 35, and plural pairs of wire engaging pins 36 ($36_1$ to $36_3$) and terminal engaging pins 37 ($37_1$ to $37_3$) are retractably disposed on the wiring table 32.

These pins 35, 36, and 37 erect from a mounting base which is not shown, and are caused to collectively protrude from and retract into holes formed in the wiring table 32 by raising and lowering the mounting base.

First, second, and third wire engaging pins $36_1$, $36_2$, and $36_3$ which are respectively paired are linearly arranged at the center of the wiring table 32 with starting from the side closer to the pair of connector engaging pins 35. The terminal engaging pins $37_1$, to $37_3$ are arranged so as to sandwich or on both the sides of the pairs of wire engaging pins $36_1$, to $36_3$. The gap between the engaging pins $36_3$ which are remotest from the connector engaging pins 35 is smallest. As a pair of pins are closer to the connector engaging pins 35, the gap between the pins is larger. These gaps respectively form spans in which the wires 22' laid in the gap can be housed in a substantially flat manner.

In the formation of the harness 34 for a plate, the terminal-equipped wires 22'(see FIG. 7) which are previously obtained are moved onto the wiring table 32, the back face (the wire connection side) of the connector 31 abuts against the pair of connector engaging pins 35, and the wires 22' are then arranged between the wire engaging pins $36_1$, between the pins $36_2$, and between the pins $36_3$.

Next, the plural wires 22' between the wire engaging pins $36_3$ are arranged so that a flat state in which the wires do not overlap nor cross with one another is maintained. The wires are bent at the pins $36_3$ to either side into an L-like shape. The bolt insertion holes 18a of the overlap contact portions 18 in the voltage-detection terminal units 17 at the tip end portions of the wires are engaged with the terminal engaging pins $37_3$, respectively. Thereafter, the flat portions of the wires 22' are bundled by the tape 33. Also the wires 22' between the wire engaging pins $36_2$ and between the pins $36_1$, are then processed in the same manner.

As a result, as shown in FIG. 8, the harness 34 for a plate is formed in which the connector 31 is attached to the one-end side of the flatly arranged wires 22', the other-end sides are branched at given intervals by bending into an L-like shape in a bilaterally symmetrical manner by the wire engaging pins 36 and the terminal engaging pins 37, and the voltage-detection terminal units 17 are connected to the tip ends.

Figure 9:
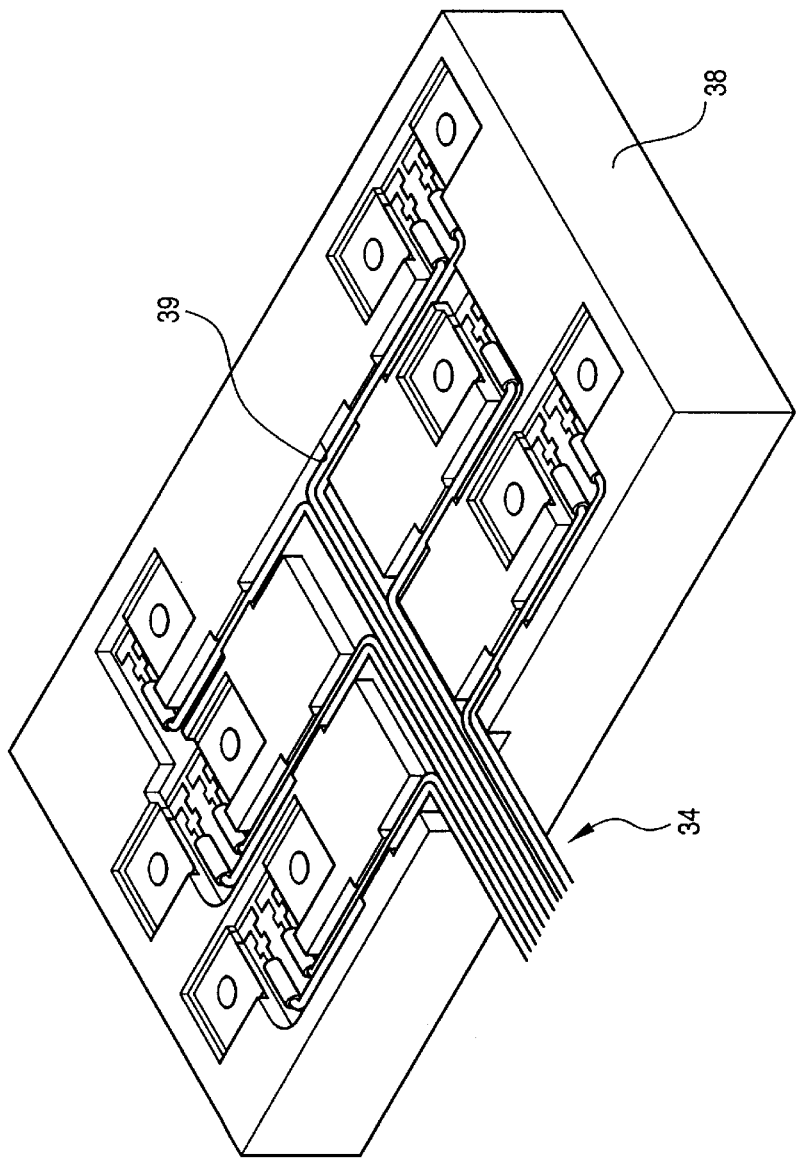
FIG. 9 is a view illustrating a production step (a primary molding) subsequent to that of FIG. 8.
Figure 10:
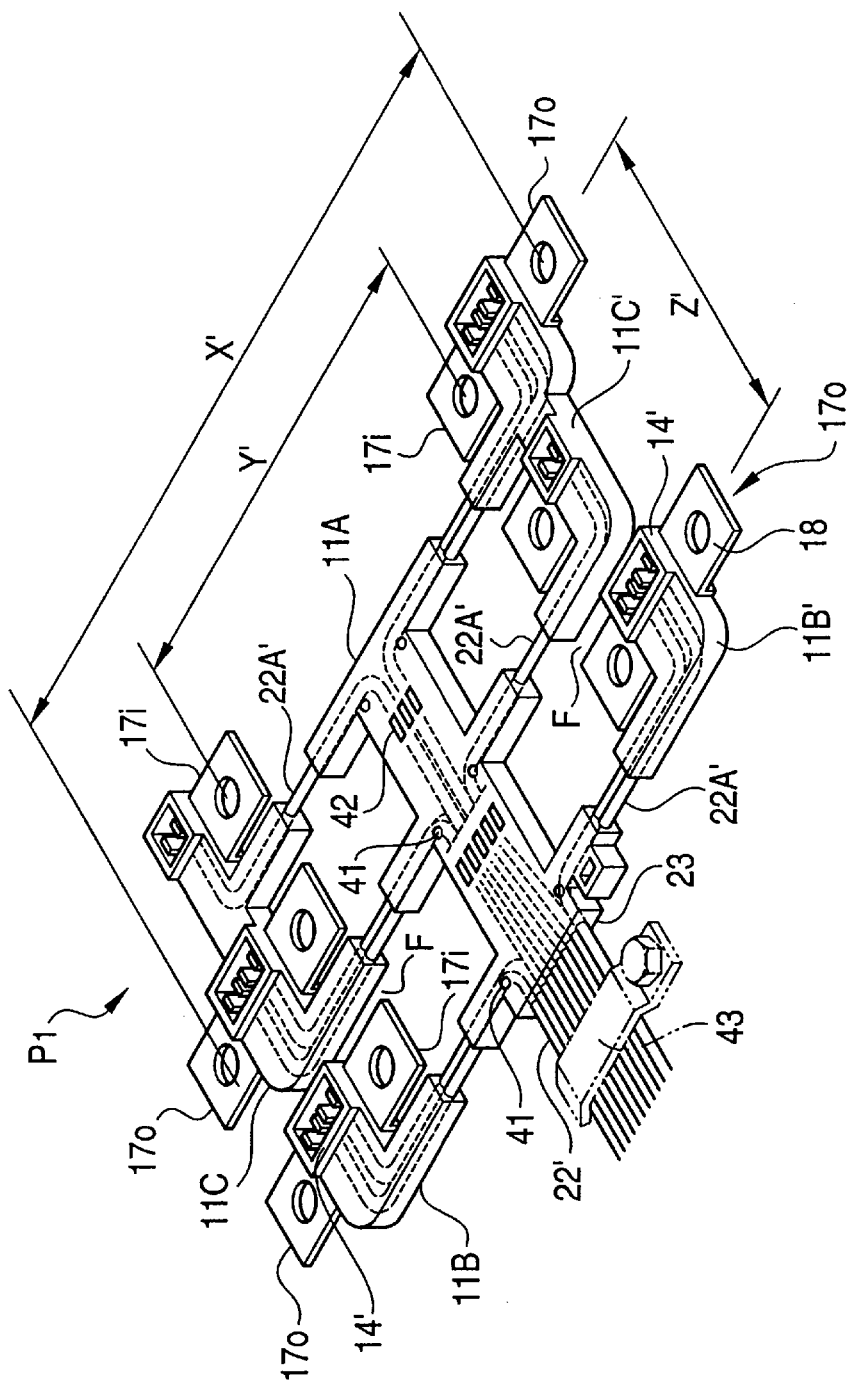
FIG. 10 is a perspective view of main portions of a primary molded product obtained in the step of FIG. 9.

The harness 34 for a plate is detached from the wiring table 32, and, as shown in FIG. 9, then set in a recess 39 of a primary mold 38 to be subjected to the insert molding by a known method (the upper mold corresponding to the mold 38 is not shown), thereby obtaining a primary molded product $P_1$ shown in FIG. 10.

In the connecting plate 10 of FIG. 2, the dimension X between the outer voltage-detection terminal units $17_o$. which are largely separated from each other, the dimension Y between the inner terminals $17_i$, and the dimension Z between the terminals 17o which are vertically separated from each other must be correct, and hence severe accuracy is requested. However, it is difficult to perform the insert molding by one step while, from an initial stage, maintaining the accuracy of the dimensions between the many bus bars 16 and 16' and the wire-equipped voltage-detection terminal units 17.

As apparent from FIG. 10, the primary molded product $P_1$ is integrally molded by primary molded resin boards 11A, 11B, 11B', 11C, and 11C' with leaving a part 22A' of the wires 22', and the overlap contact portions 18 and the device mounting portions 19 of the voltage-detection terminal units 17.

Specifically, there exist the wire exposed portions 22A' among the primary molded resin board 11A in a center portion of the primary molded product $P_1$ and the primary molded resin boards 11B, 11C, 11B', and 11C' on the lateral sides. Furthermore, there is no tie in the gaps on the lateral sides between the primary molded resin boards 11B and 11C, and 11B' and 11C' where the wires 22' do not exist. The gaps constitute free portions F.

In the primary molded resin board 11A in the center portion, plural pin holes 41 and vertical grooves 42 are formed, and the wire holder 23 is integrally disposed. The pin holes 41 and the vertical grooves 42 are formed by pins and bosses (both are not shown) which protrude into the recess 39 in order to prevent the wires 22' from, in the insert molding using the primary mold 38, being subjected to an excessive force due to the injection force of the resin, or twined with each other. A wire fixing piece 43 which is indicated by phantom lines is disposed in the mold 38, so that, in the primary insert molding, the wires 22' on the side of the connector 31 are prevented from being disturbed and stress concentration at the outlet of the wire holder 23 is prevented from occurring.

In the primary molded resin board 11B (11B'), a window frame 14' for forming a resin non-filled portion, i.e., the fuse mounting window 14 is disposed, two voltage-detection terminal units $17_o$. and $17_i$ are fixed by the insert molding so as to laterally interpose the window frame 14' therebetween, the overlap contact portions 18 of the two terminals are exposed to the outside, and the device mounting portions 19 are exposed in the window frame 14'.

By contrast, in the primary molded resin board 11C (11C'), laterally arranged voltage-detection terminal units $17_o$, and $17_i$ which are configured in a similar manner as those of the primary molded resin board 11B are vertically arranged, so that three or four terminals in total are fixed by the insert molding.

Any one of the primary molded resin boards 11B 11C of the primary molded product $P_1$ is configured by fixing two to four voltage-detection terminal units $17_o$ and $17_i$ which are close to each other, by the insert molding. Therefore, the terminals can be fixed with substantially high accuracy of the dimension between the terminals and without being largely affected by the kind of the resin.

In the primary molded product P1, therefore, the dimensions X', Y', and Z' between various terminals in FIG. 10 may be formed so as to be longer than the dimensions of the connecting plate 10 of the final product of FIG. 2, by using the wire exposed portions 22A' and the free portions F as dimension adjusting portions, and the dimensions may be finally adjusted in the secondary molding.

Figure 11:
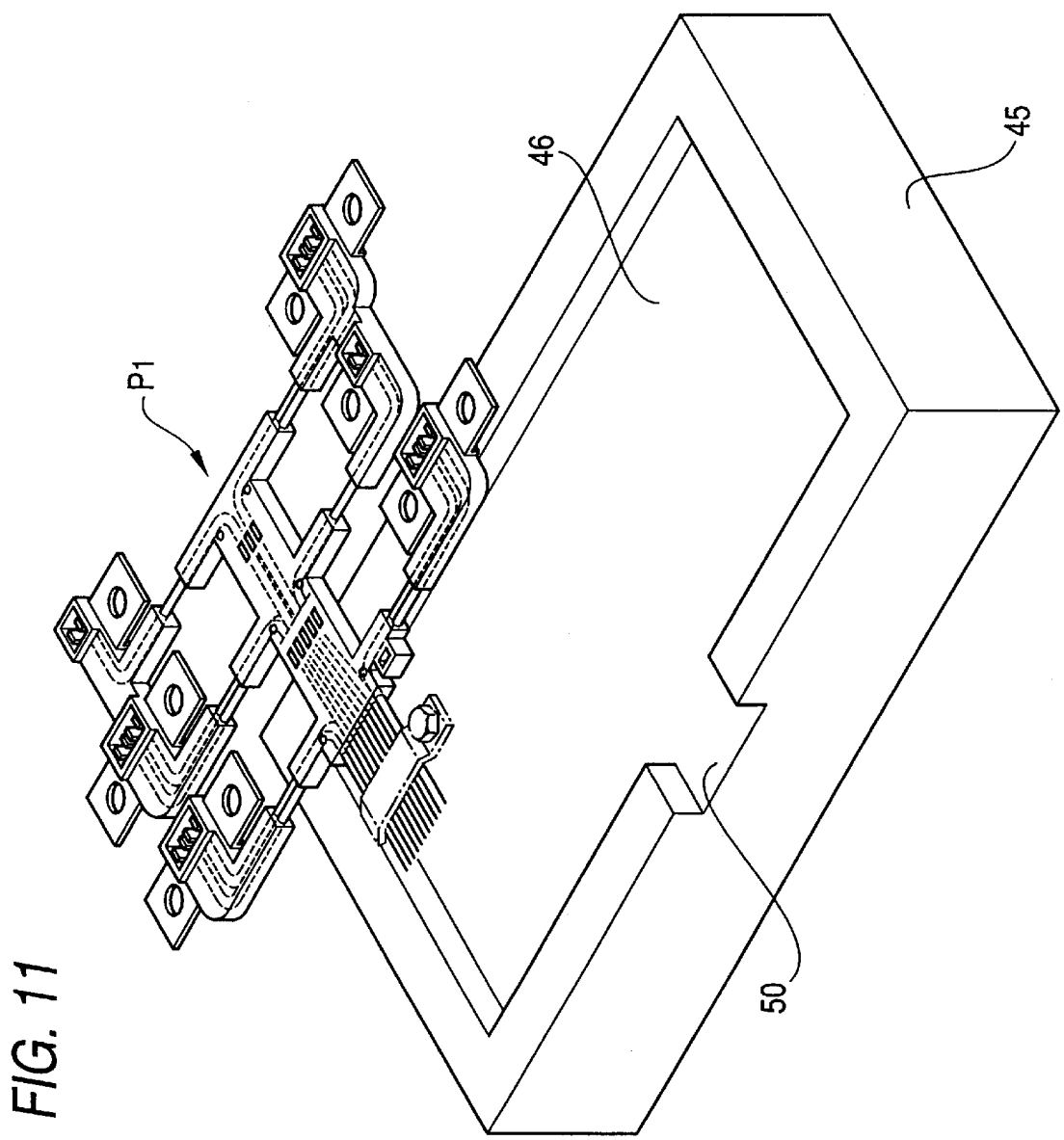
FIG. 11 is a view illustrating a production step (a secondary molding) subsequent to that of FIG. 9.
Figure 12:
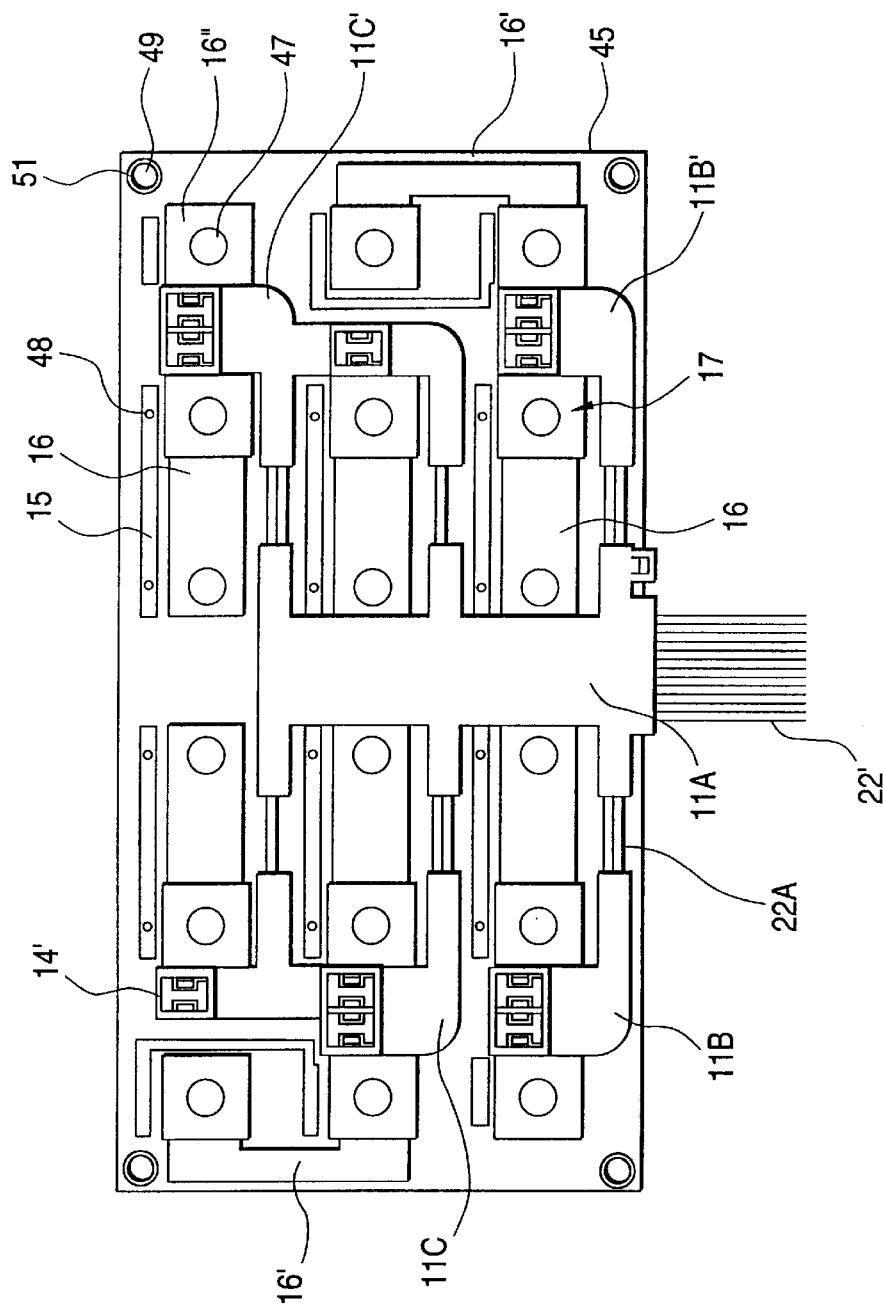
FIG. 12 is a plan view showing a state in which the primary molded product of FIG. 11 is set in a mold.
Figure 13:
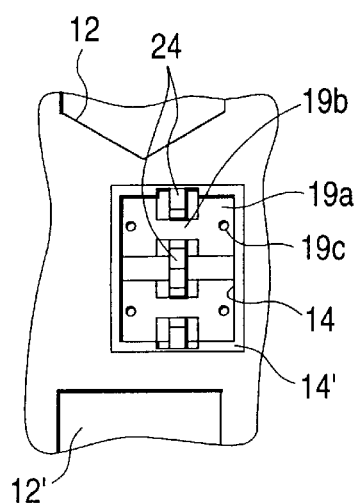
FIGS. 13(A) to 13(D) show the final production step (a step of mounting a circuit protecting device)
Figure 13:
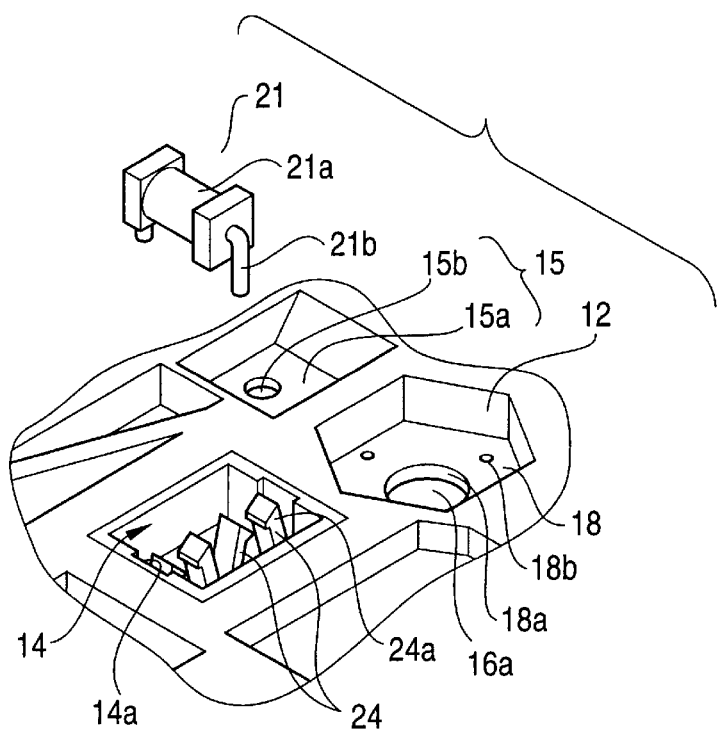
Figure 13:
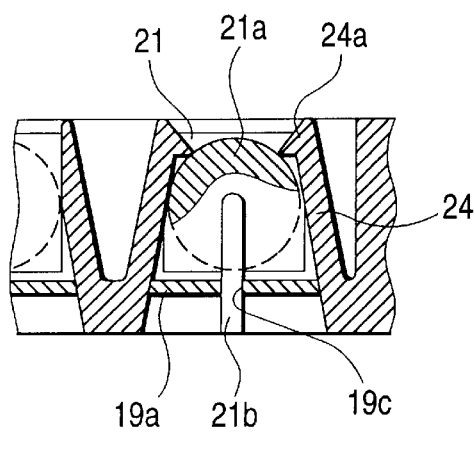
Figure 13:
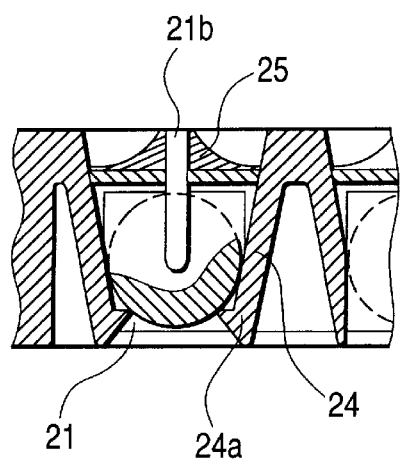
Figure 14:
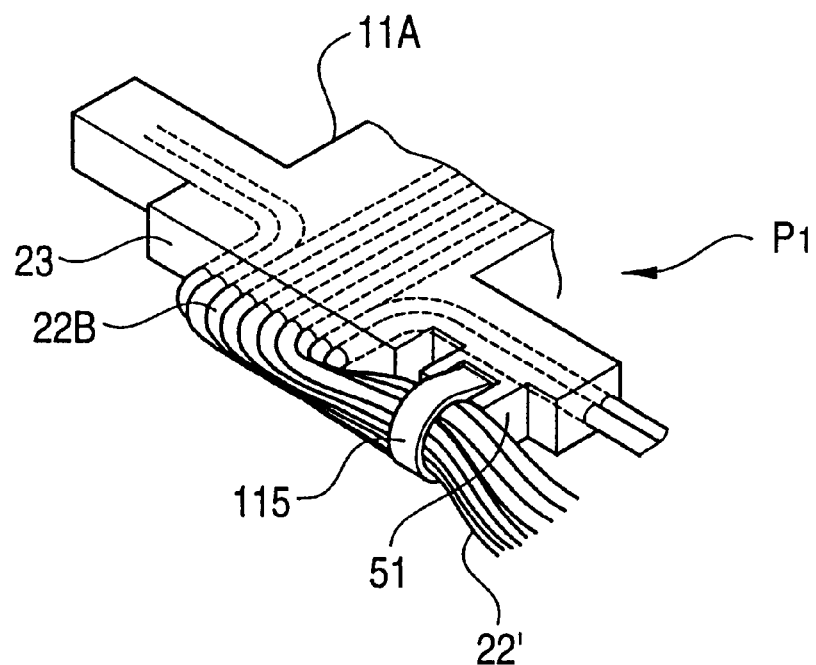
FIGS. 14(A) and 14(B) show a manner of leading out connecting wires of the connecting plate for a battery holder of FIG. 2.
Figure 14:
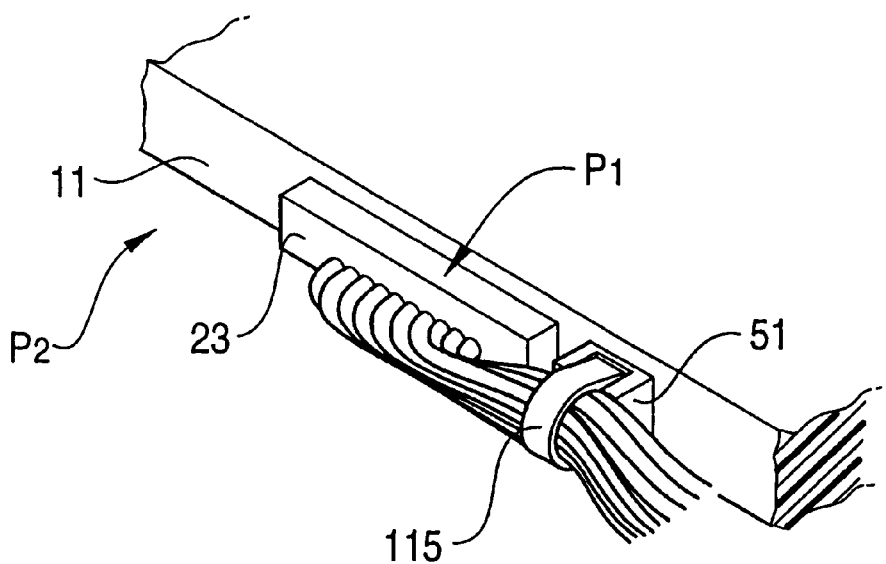
Figure 15:
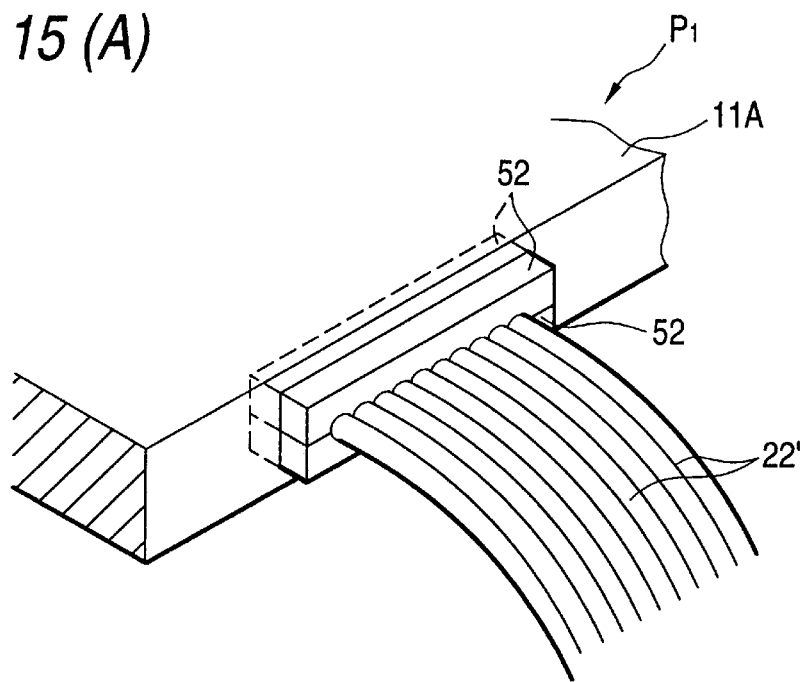
FIGS. 15(A) and 15(B) show another embodiment of the primary molding step of FIG. 9.
Figure 15:
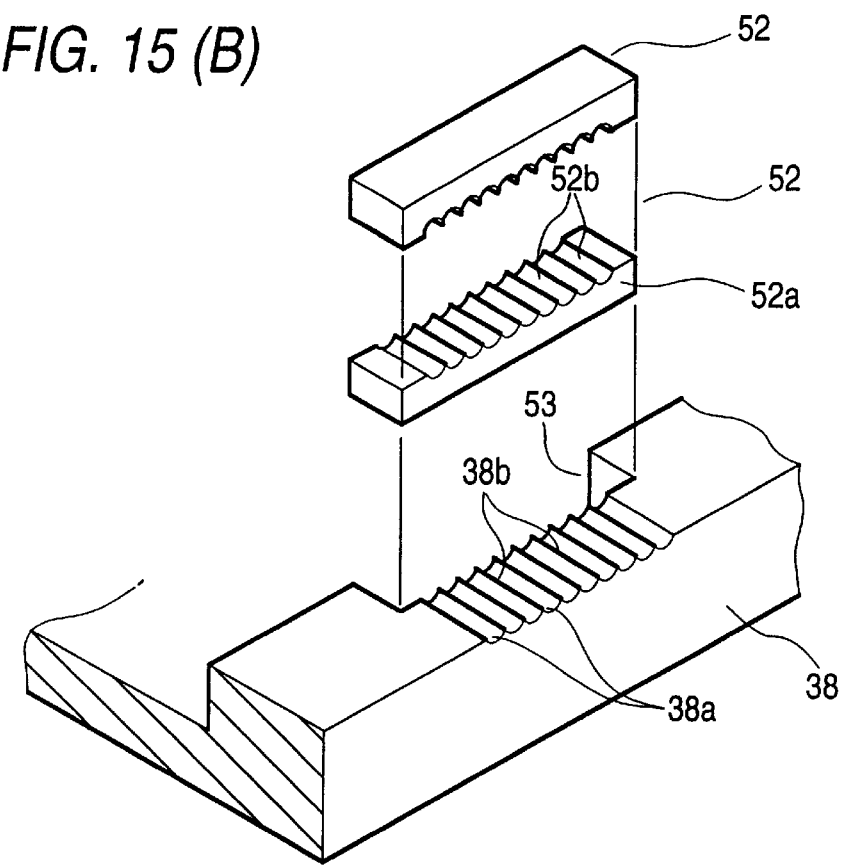

Next, as shown in FIGS. 11 and 12, the primary molded product $P_1$ is set in a secondary mold 45, and a secondary insert molding is then performed.

In a recess 46 of the secondary mold 45, positioning engaging pins 47 and 48 for the bus bars 16 and 16' and the PTC device connecting pieces 15 are disposed, and collar engaging pins 49 are disposed at the four corners. Moreover, the positioning bosses (not shown) for the pin holes 41 and the vertical grooves 42 of the primary molded product $P_1$ are disposed. The reference numeral 50 denotes a holder placing groove for the wire holder 23.

The bus bars 16, 16', and 16", the connecting pieces 15, and a collar 51 are correctly positioned and engaged by the various engaging pins 47 to 49 in the recess 46. Thereafter, the primary molded resin boards 11A to 11C, 11B', and 11C' of the primary molded product $P_1$ are set, and the positioning of predetermined bus bars 16 and the voltage-detection terminal units 17 is performed.

The positioning is performed in the following manner. The overlap contact portions 18 of the voltage-detection terminal units 17 are overlaid on corner portions of the bus bars 16 and 16' which have been set, so that the resin leakage preventing pieces 18c and 18c' of each of the portions abut against the side edges of the end portion of the corresponding bus bar 16 or 16' which perpendicularly intersect with each other, as described above (see FIG. 4).

Next, an upper mold (not shown) which is paired with the secondary mold 45 is set on the secondary mold, and the insert molding is then performed under predetermined conditions, thereby obtaining a secondary molded product.

The secondary molded product is different from the completed connecting plate 10 shown in FIG. 2 in that the fuses 21 are not mounted to the fuse mounting windows 14. The illustration of the whole of the secondary molded product is omitted.

Namely, in the secondary molded product, in the same manner as the connecting plate 10, the bus bars 16 and 16' and the like for connecting the electrodes 2a and 2b of the batteries A, and the connecting pieces 15 for connecting the PTC devices are embedded together with the primary molded resin boards 11A to 11C and the like and the free portions F of the primary molded product $P_1$, into the molded resin board 11. The hexagonal windows 12 and rectangular windows 12' for connecting the electrodes, and the rectangular windows 13 for connecting the PTC devices are opened. The device mounting portions 19 of the voltage-detection terminal units 17 are exposed through the fuse mounting windows 14.

When the fuses 21 are mounted to the fuse mounting windows 14 of the secondary molded product, therefore, the connecting plate 10 which is the completed product is obtained.

As shown in FIG. 13(A), in the secondary molded product $P_2$, the pair of lead connecting pieces 19a of the device mounting portion 19 are connected to each other by the connecting piece 19*b* in the fuse mounting window 14. As shown in FIG. 13(B), the connecting piece 19*b* is cut away, the leads 21*a* of the fuse 21 are passed through the lead connection holes 19*c* of the lead connecting pieces 19*a*, and at the same time the fuse body unit 21*a* is pressingly inserted between the pair of fuse engaging arms 24.

As a result, as shown in FIG. 13(C), the fuse body unit 21*a* is clamped between the engaging arms 24, and the hook-like engaging projections 24*a* serve as stoppers. Consequently, the fuse 21 does not vertically slip off and is surely clamped.

Even when the secondary molded product $P_2$ is turned upside down as shown in FIG. 13(D), therefore, there arises no fear that the fuse 21 slips off, and the solder 25 can be applied very easily.

As a result of the above process, the connecting plate 10 (10') which is the completed product is obtained.

Since the fuse 21 is clamped by the pair of fuse engaging arms 24 so as to be prevented from slipping off, the secondary molded product $P_2$ can be easily stocked and transported.

FIGS. 14(A) and 14(B) show other embodiments of the primary molded product $P_1$ and the secondary molded product P2 in which the manner of leading out the connecting wires in the connecting plate is improved.

In the embodiment of FIG. 14(A), the primary molded resin board 11A in the center portion of the primary molded product $P_1$ is configured so that a fixing frame 51 is formed integrally with one side of the wire holder 23 for binding the wires 22' and a band 115 (see FIG. 14(B)) for binding the wires 22' is tied to the fixing frame 51 so as to perform the fixation. According to this configuration, even when an external force acts on the wires 22', stress concentration at the root portions 22B of the wires can be relaxed or blocked.

During transportation or stock in the process of forming the primary molded product $P_1$ into the secondary molded product $P_2$ shown in FIG. 14(B), or after the secondary molding is performed and the molded product is embedded into and protected by the molded resin board 11, therefore, the wires 22' are effectively prevented from being broken.

FIGS. 15(A) and 15(B) show another embodiment for stress relaxation.

The primary molded product $P_1$ of FIG. 15(A) is configured so that, in place of the wire holder 23 for bundling the wires 22' of the primary molded resin board 11A into a flat shape, a pair of upper and lower mats 52 clamp the wires. In each of the mats 52, plural wire placing grooves 52*b* are arranged on one face of a block-like mat body 52*a*. Each mat is made of an elastic member having heat resistance, such as silicone rubber. The rear half portions of the mats 52 which vertically clamp the wires 22' are embedded into the primary molded resin board 11A, and the front half portions protrude from the resin board 11A. Therefore, stress acting on the root portions 22B of the wires 22' can be absorbed and relaxed.

As shown in FIG. 15(B), a mat receive groove 53 is formed in the inner side of wire placing grooves 38*a* of the primary mold 38, and the mats 52 are placed in the mat receive groove. Therefore, the primary molding may be performed by a conventional method.

In the primary molding, the resin which is injected or filled into the primary mold 38 is blocked by the upper and lower mats 52. Therefore, the interface portions (or edges) 38*b* between the wire placing grooves 38*a* can be loosely formed, so that the wires 22' are prevented from being bit.

Figure 16:
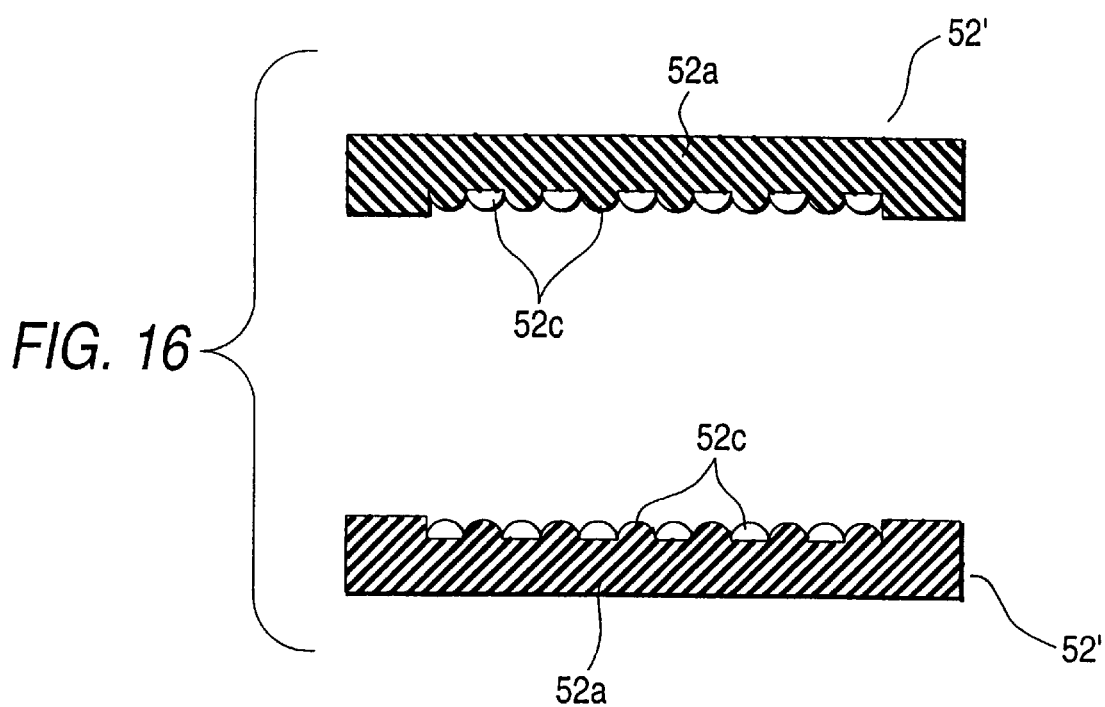
FIG. 16 is a section view showing another embodiment of the rubber mat.
Figure 17:
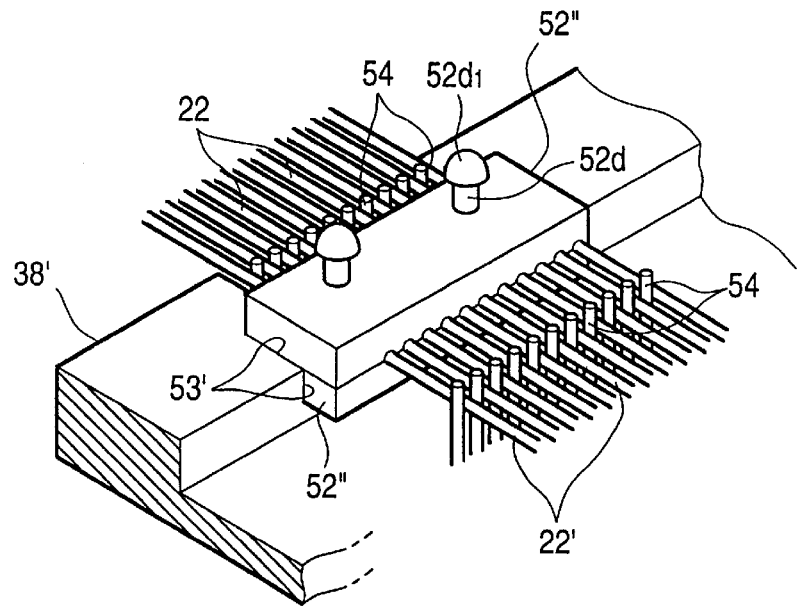
FIGS. 17(A) and 17(B) show a supplementary embodiment of the primary molding step of FIG. 9.
Figure 17:
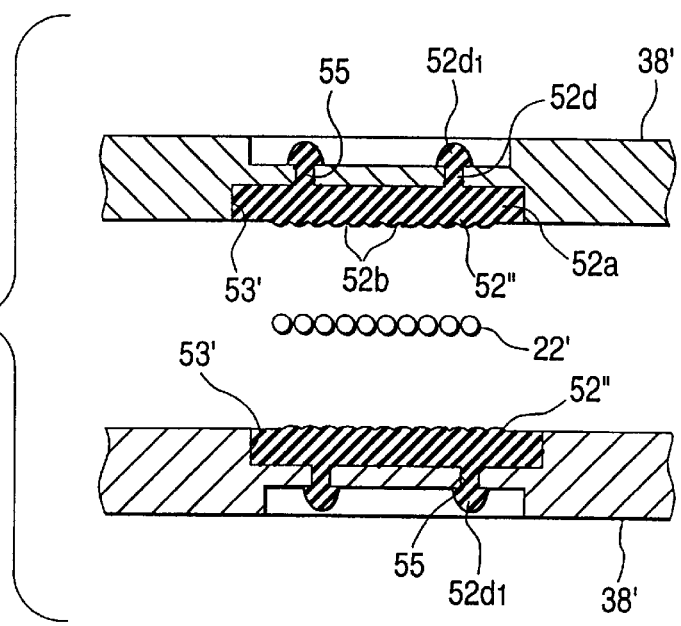

FIG. 16 shows another embodiment of the mats for stress relaxation.

In mats 52' shown in FIG. 16, a large number of projections 52*c* are formed in a staggered manner on one face of each of mat bodies 52*a*. The projections 52*c* may have any one of shapes such as a cylindrical shape, a prism-like shape, and a semispherical shape. Preferably, the projections have a semispherical shape.

The mats 52' can be used in the primary molding by using the primary mold 38 having the mat receive groove 53 shown in FIG. 15(B), and attain the same effects as that of FIG. 15(A).

FIGS. 17(A) and 17(B) show supplementary embodiments of the mats for stress relaxation and the primary mold.

Referring to FIG. 17(A), in each of upper and lower mats 52", plural wire placing grooves 52*b* are disposed in one face of a mat body 52*a*, and a pair of engaging bosses 52*d* protrude from the opposite face of the mat body. The engaging bosses 52*d* are provided at the tip end with a bulb-like engaging projections 52$d_1$.

In order to comply with the mats 52", in a primary mold 38', in place of the wire placing grooves 38*a*, plural guide pins 54 are disposed so as to protrude in front and rear of a mat receive groove 53', and engaging holes 55 corresponding to the engaging bosses 52*d* of the mats 52" are disposed.

In the case of the mats 52", when the engaging bosses 52*d* are strongly pressed against the respective engaging holes 55, the engaging bosses 52*d* at the tip end pass through the engaging holes 55 to be engaged therewith as shown in FIG. 17(B). Consequently, there is no fear that the mats 52" which have been once set slip off. The wires 22' may be placed so as to separately or one by one pass through between the guide pins 54 which are arranged in front and rear of the mats 52". As a result, the wires naturally correspond in one to one relationship to the wire placing grooves 52*b* of the mats 52", and hence the work can be simplified.

Figure 18:
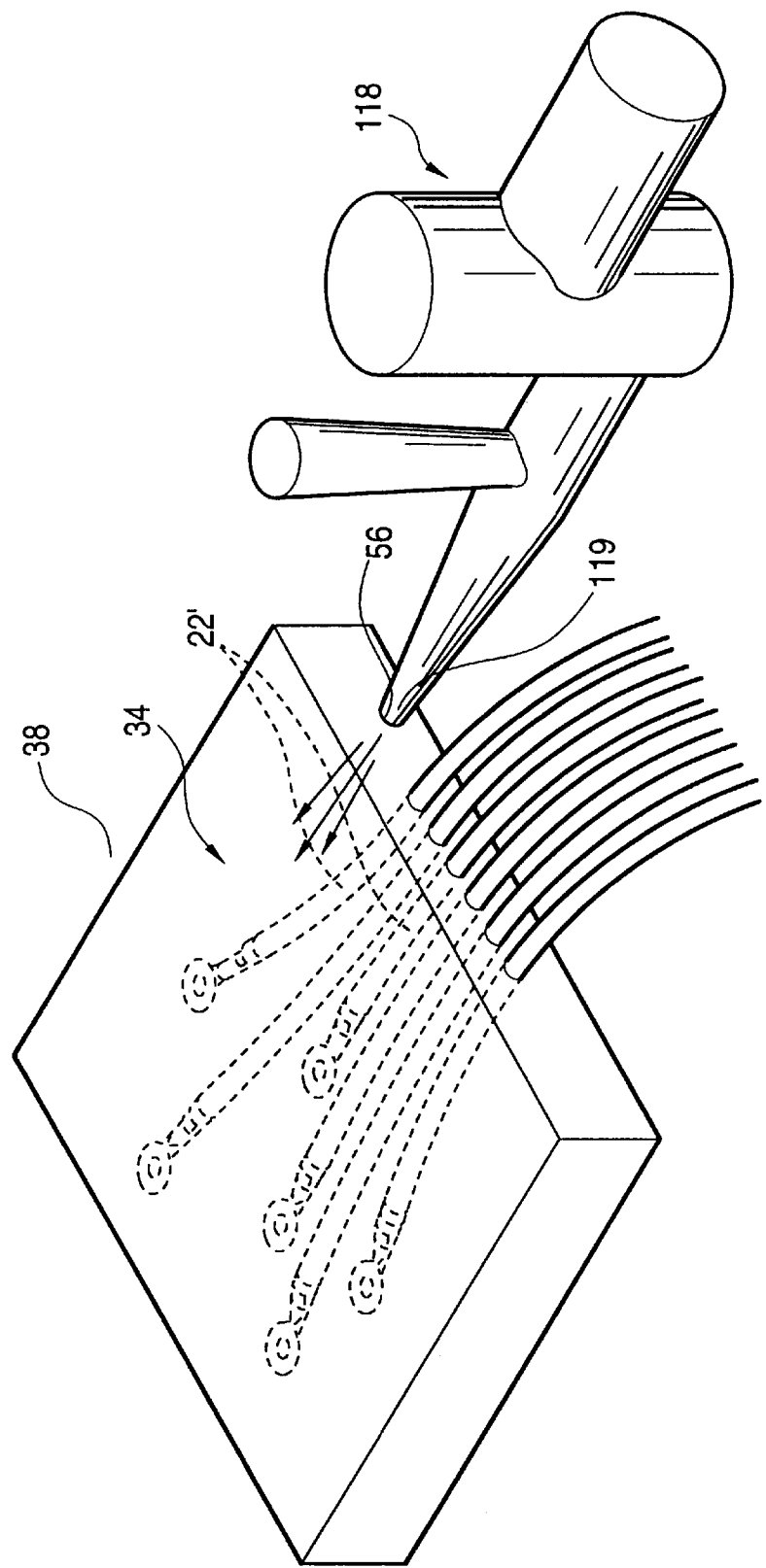
FIG. 18 shows another supplementary embodiment of the primary molding step of FIG. 9 and is a view illustrating a method of supplying a resin to molds.

FIG. 18 shows a method of supplying a resin to molds in the primary molding.

Referring to FIG. 18, a resin filling hole 56 which is directed along the laying direction of the wires 22' of the harness 34 for a plate (see FIGS. 8 and 9) in the inner side is opened in a side face of the primary mold 38.

The flow of the molten resin injected from a nozzle 119 of a molding machine 118 is directed along the laying direction of the wires 22' as indicated by the arrow lines. According to this configuration, a resin skin is first formed on the surfaces of the wires 22', and hence the hot resin does not thereafter make direct contact with the wires 22'. As a result, melt fracture of the wire coating portions is eliminated. Unlike the related art, therefore, it is not required to use a heat resistant material such as a polyimide resin in the insulation coating of the wires 22 (22').

FIGS. 19(A) and 19(B) are perspective views of main portions and showing the structure for connecting the bus bar 16, the voltage-detection terminal unit 17, and the fuse 21. FIG. 19(A) shows a state in the secondary molding, and FIG. 19(B) shows that in the final step. FIGS. 20(A) and 20(B) are section views respectively taken along lines X—X and Y—Y of FIG. 19(B). In order to simplify the drawings, the fuse engaging arms 24 are not shown.

Prior to the secondary insert molding, the voltage-detection terminal unit 17 is positioned with respect to the bus bar 16. This positioning can be easily performed because, as described above, the two resin leakage preventing pieces 18*c* and 18*c'* which perpendicularly intersect with each other serve as positioning pieces with respect to the bus bar 16.

In the secondary molding, a fear that a molten resin enters between the overlapping faces of the bus bar 16 and the overlap contact portion 18 is substantially eliminated by the blocking function due to the resin leakage preventing piece 18c or 18c' which is positioned in the flow direction of the molten resin. The bus bar and the portion are surely contacted and fixed by mold fixation.

As shown in FIG. 20(A), even when a molten resin 57 enters between the bus bar 16 and the overlap contact portion 18, the entrance can be easily checked through the resin leakage inspection holes 18b, whereby a defective product and a failure in the flow can be prevented from occurring.

A secondary molded product $P_2$ which is checked that the resin leakage does not occur in the secondary insert molding is processed in the following manner. In the fuse mounting window 14, the connecting piece 19b of the device mounting portion 19 is cut away as shown in FIG. 19(B). The leads 21a of the fuse 21 are passed through the lead connection holes 19c of the remaining lead connecting pieces 19a at the ends, and then applied with solder 25 as shown in FIG. 20(B).

Figure 19:
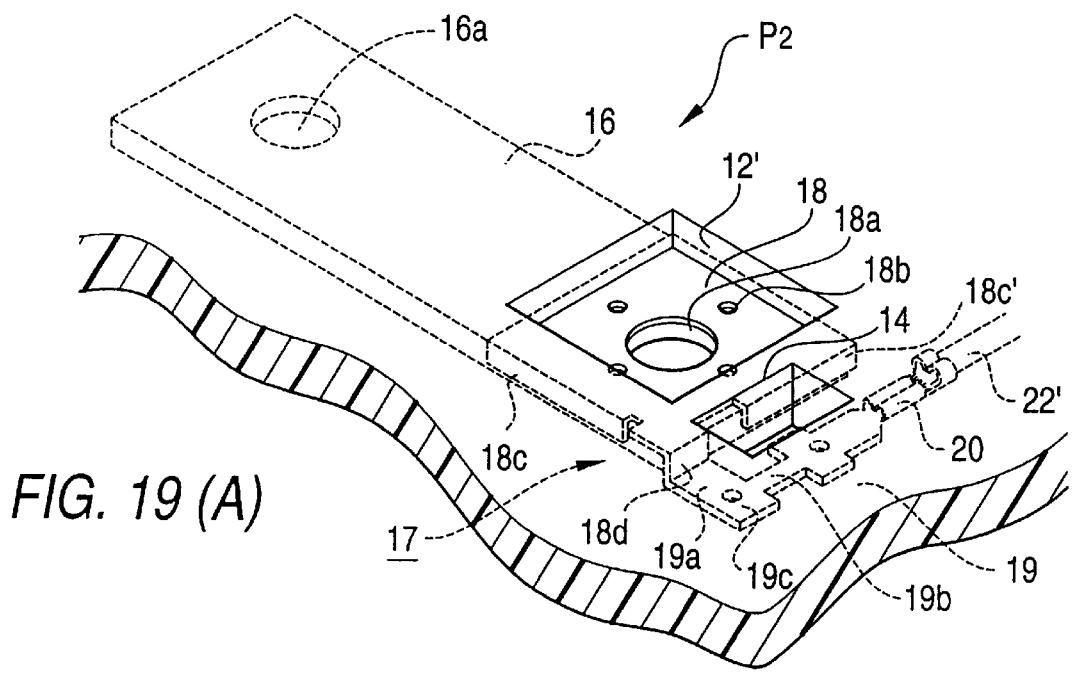
FIGS. 19(A) and 19(B) show main portions and illustrates a structure for connecting the bus bar, the voltage-detection terminal unit, and the circuit protecting device in the connecting plate for a battery holder.
Figure 19:
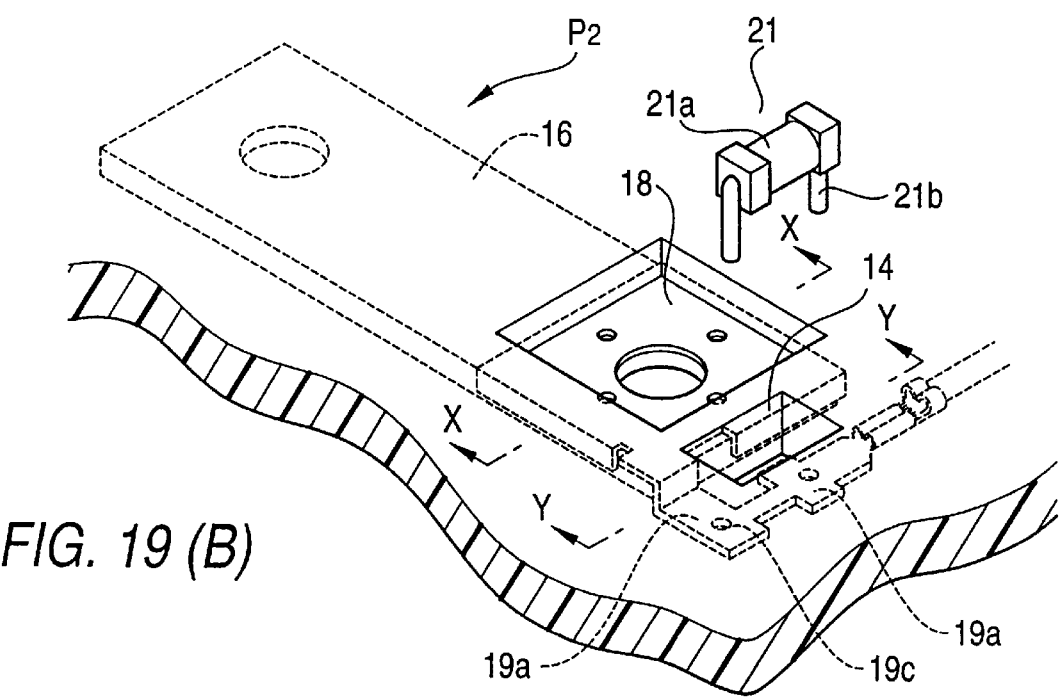
Figure 20:
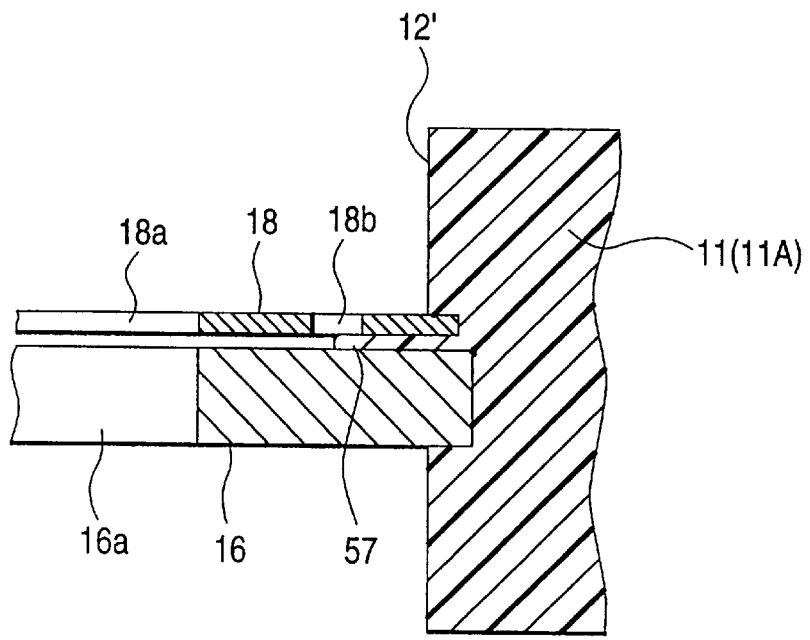
FIG. 20(A) is a section view taken along the line X—X of FIG. 19(B)
FIG. 20(B) is a section view taken along the line Y—Y of FIG. 19(B) and showing a state in which the circuit protecting device is attached.
Figure 20:
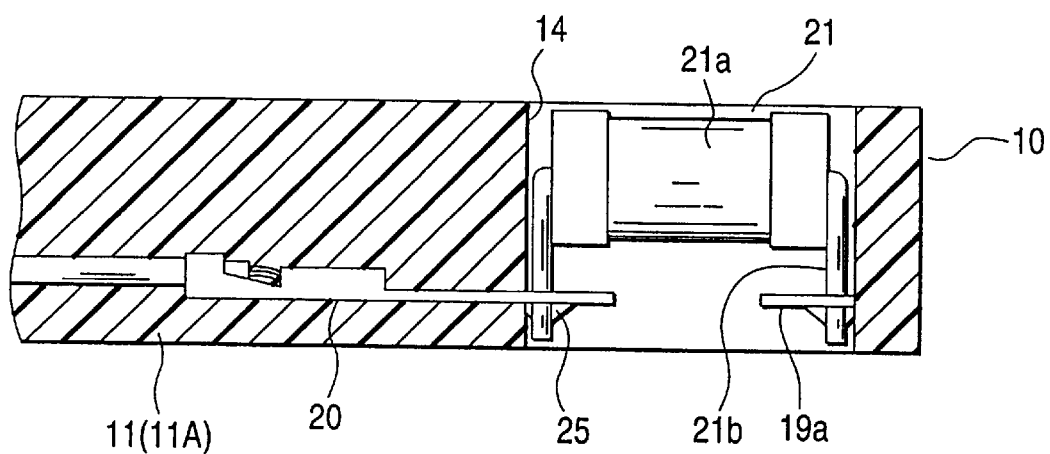
Figure 21:
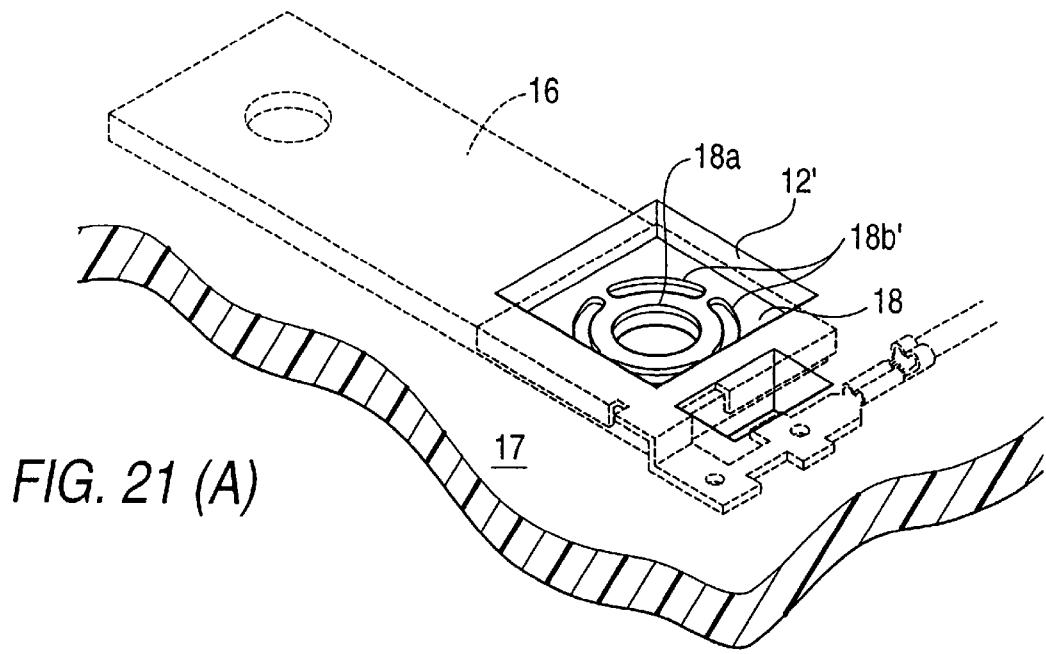
FIGS. 21(A) and 21(B) are views illustrating another structure for connecting the bus bar, the voltage-detection terminal unit, and the circuit protecting device in the connecting plate for a battery holder.
Figure 21:
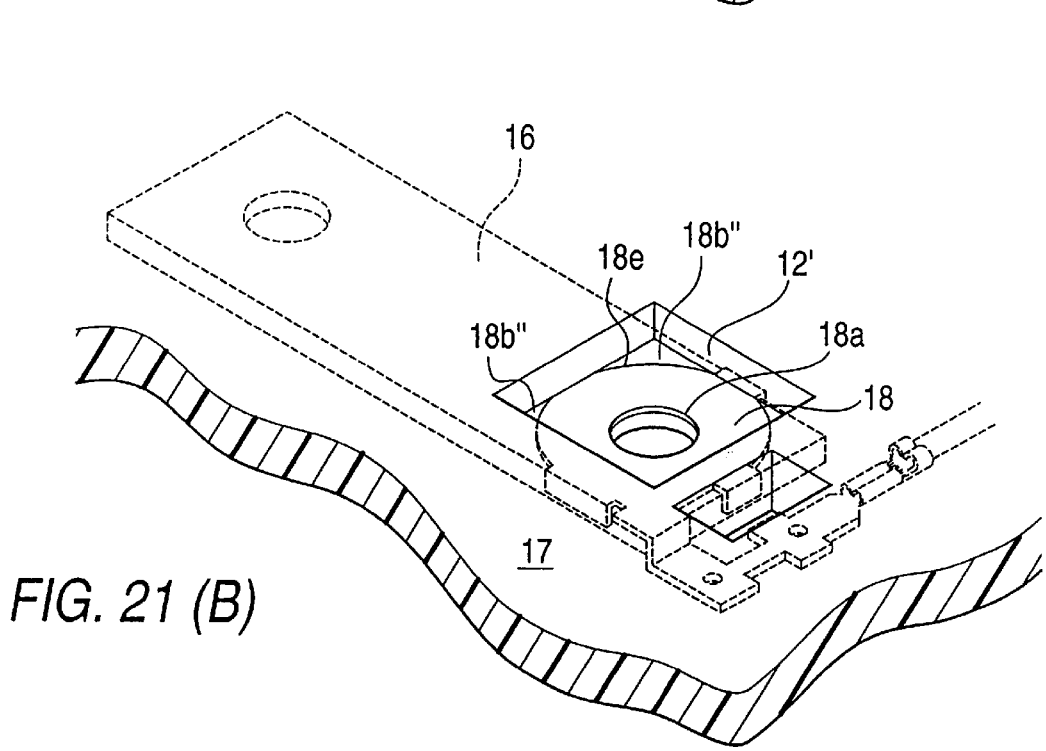

As seen from the comparison of FIGS. 19(B) and 19 (A), the lead connecting pieces to which the leads 21a at the ends of the fuse 21 are to be connected, i.e., the lead connecting piece 19a on the side of the overlap contact portion 18, and the lead connecting piece 19a on the side of the wire connecting portion 20 are initially connected to each other through the connecting piece 19b. In the primary and secondary moldings, therefore, the parts such as the overlap contact portion 18, the device mounting portion 19, and the wire connecting portion 20 can be collectively handled as a single part, i.e., the voltage-detection terminal unit 17. As a result, the number of parts and the man-hour can be reduced, and the production cost can be lowered.

FIGS. 21(A) and 21(B) show other embodiments of the resin leakage inspection holes of the overlap contact portion, respectively.

The resin leakage inspection holes 18b' of FIG. 21(A) are formed as quadrant-like slits which are very larger in size than the resin leakage inspection holes 18b. The four holes are symmetrically disposed around the bolt insertion hole 18a. The resin leakage inspection holes 18b' are positioned diametrically outside a dish portion 26a of the bolt 26.

In the embodiment shown in FIG. 21(B), the overlap contact portion 18' is formed into a doughnut-like disk shape, and the spaces between the round outer peripheral edge 18e and the inner edge of the rectangular hole 12' are used as resin leakage inspection holes 18b".

Both the resin leakage inspection holes 18' and 18b" have an area which is very larger than the area of the resin leakage inspection holes 18b, and look like a window.

In the case where a large hole (or a window) such as the resin leakage inspection holes 18' or 18b" is formed, when the molten resin injected into the molds in the insert molding reaches the inspection holes 18' or 18b", the resin is abruptly released and its pressure is lowered. This perfectly prevents the resin from entering toward the center portion (i.e., the bolt insertion hole 18a), thereby eliminating a failure of continuity between the bus bar 16 and the voltage-detection terminal unit 17.

Returning to FIG. 20(B), in the connecting plate 10, the whole of the parts (the lead connecting pieces 19a at the sides, the wire connecting portion 20, and the like) to which the fuse 21 is connected are bound by the molded resin board 11. When an external force such as an impact or a pressing force is applied to a part of the connecting plate 10, therefore, stress propagates via the resin board 11 to reach the connection portions such as the solder 25, thereby producing a danger that a trouble such as a crack of the solder occurs.

Figure 22:
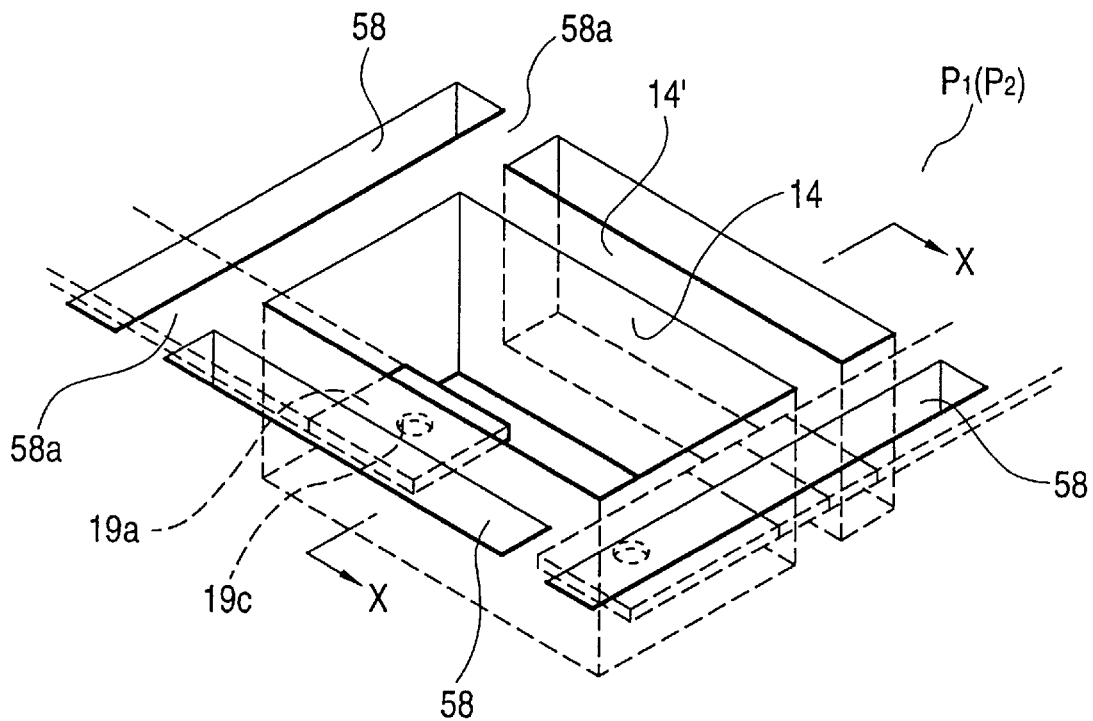
FIGS. 22(A) and 22(B) show a structure for relaxing stress in the voltage-detection terminal unit of the connecting plate for a battery holder of FIG. 1.
Figure 22:
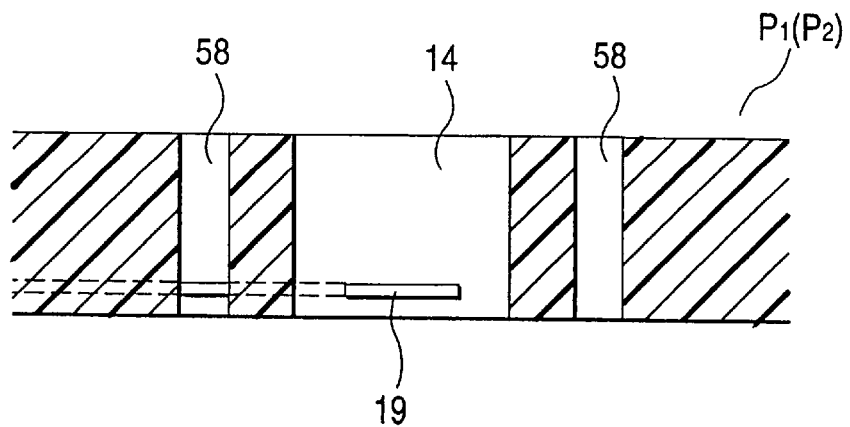
Figure 23:
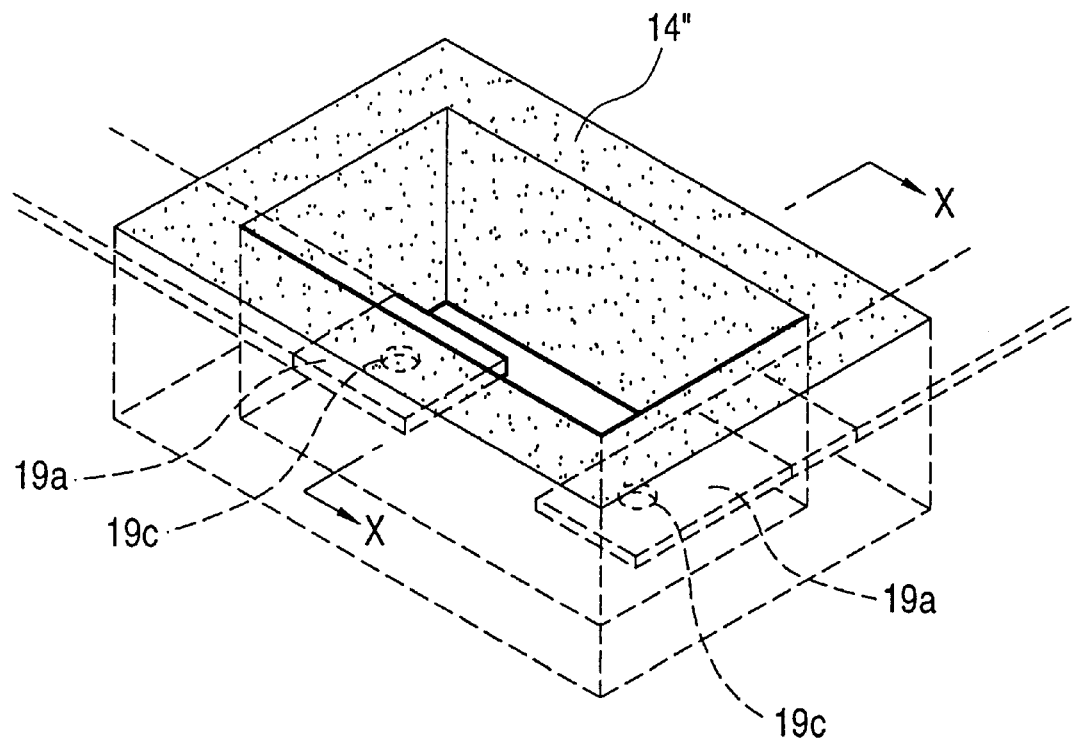
FIGS. 23(A) and 23(B) show another structure for relaxing stress in the voltage-detection terminal unit.
Figure 23:
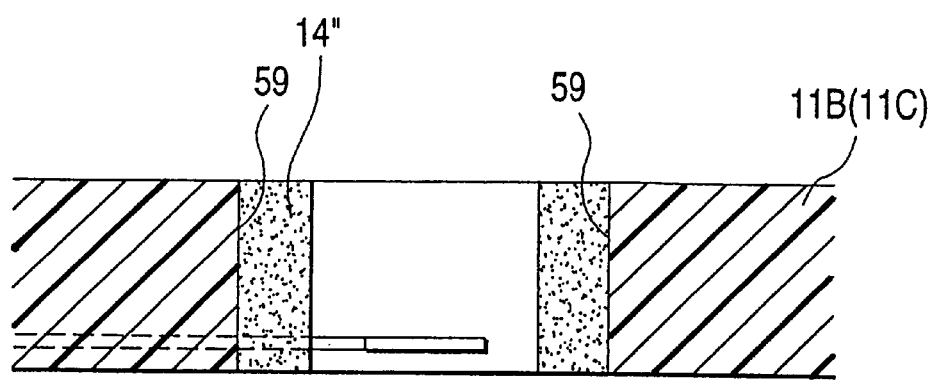
Figure 24:
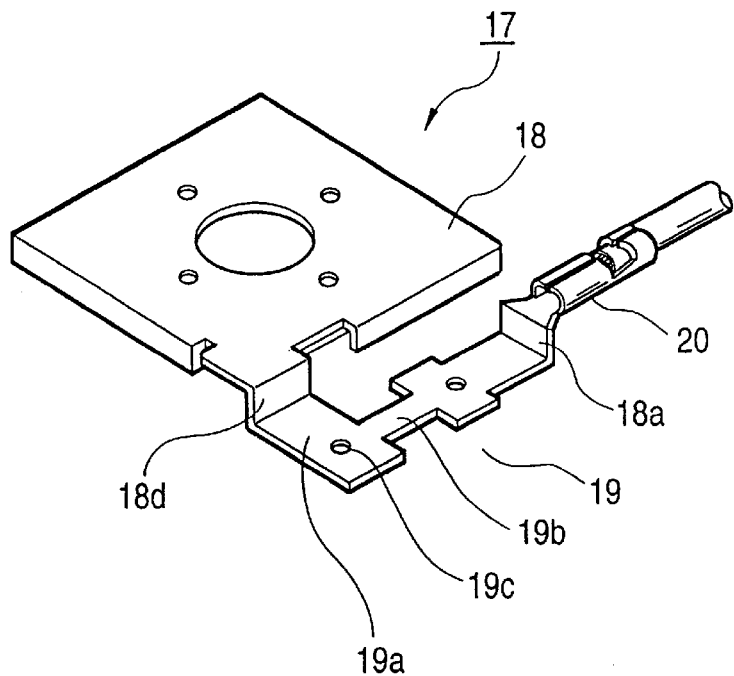
FIGS. 24(A) to 24(C) show a further structure for relaxing stress in the voltage-detection terminal unit.
Figure 24:
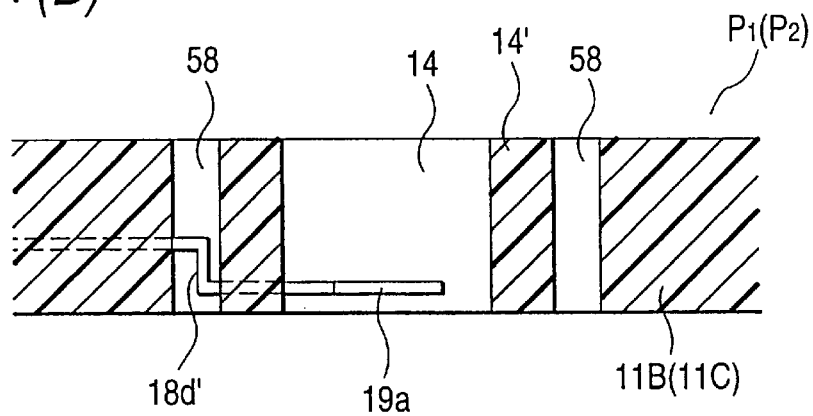
Figure 24:
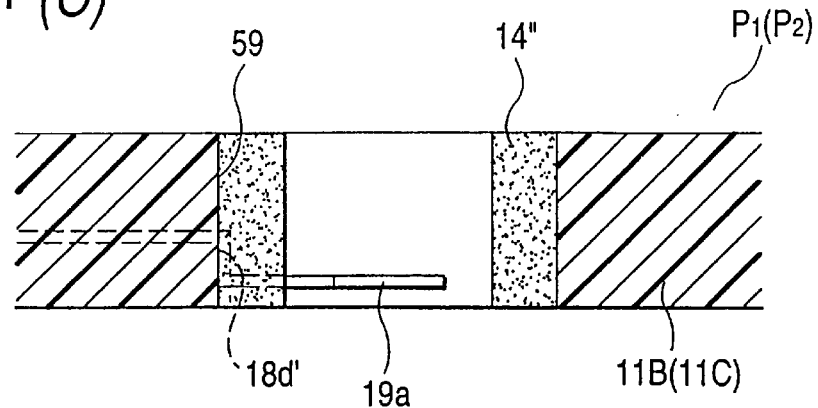
Figure 26:
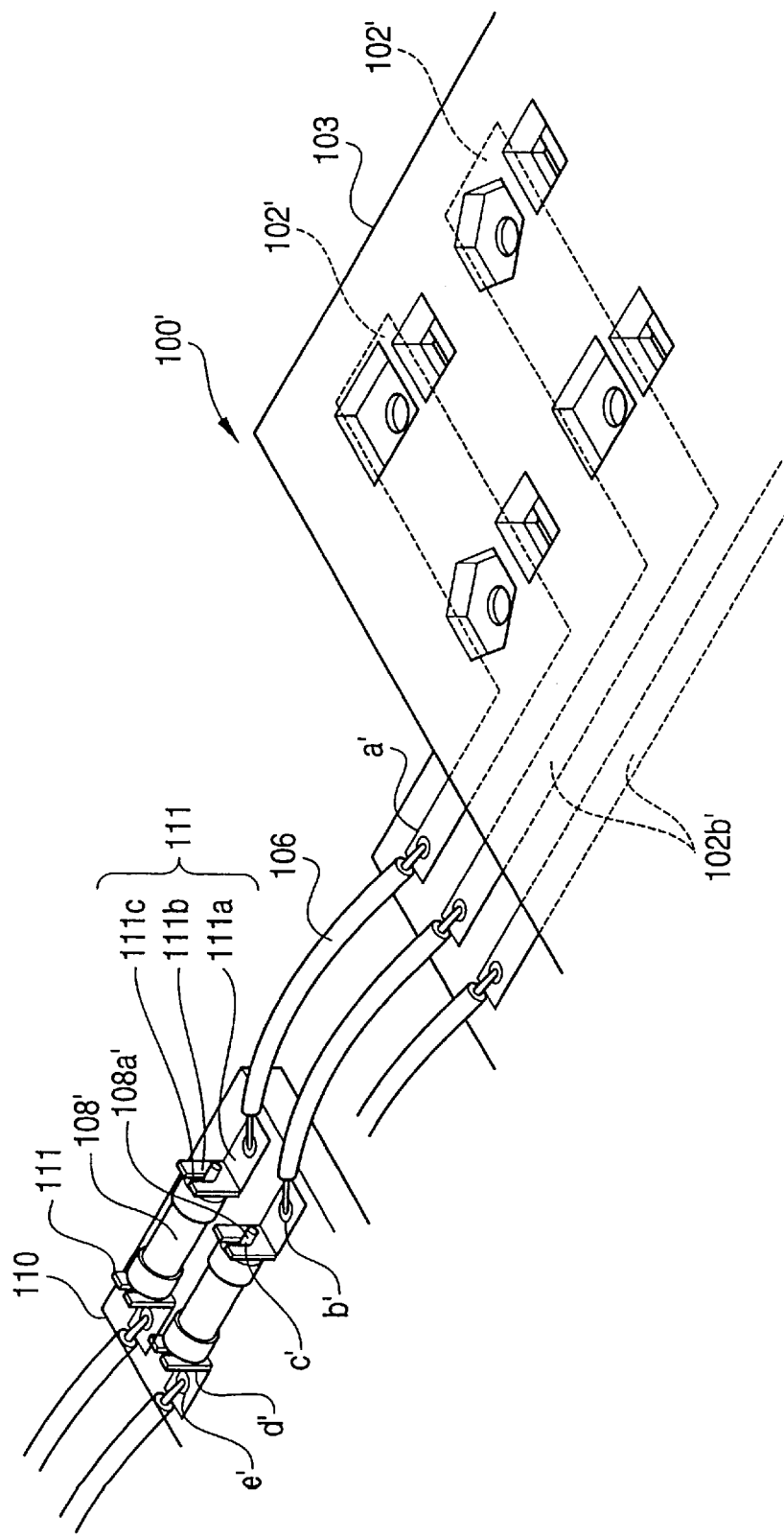
FIG. 26 is a perspective view showing main portions of another example of a conventional connecting plate for a battery holder.

FIG. 22 shows a structure for relaxing such stress. FIG. 22(A) is a perspective view of the fuse mounting window 14, and FIG. 22(B) is a longitudinal section view taken along the line X—X of FIG. 22(A).

Rectangular slits 58 are disposed around the whole periphery of the window frame 14' of the primary molded resin board 11B (1C) in the primary molded product $P_1$. The reference numeral 58a denotes ties (in the illustrated example, four ties) corresponding to spouts for a resin in the molding of the window frame 14'. A middle portion of each of the lead connecting pieces 19a at the ends of the device mounting portion 19 in the voltage-detection terminal unit 17 is located in one of the slits 58.

Even when an external force acts on the primary molded product $P_1$ (or the secondary molded product $P_2$), therefore, stress due to the force is interrupted by the slit 58, and the window frame 14' and the internal parts such as the solder 25 are not affected by the stress.

Referring to FIG. 22(A), in order to eliminate the ties 58, the resin filling hole (see FIG. 18) in the molds may be disposed for each of the whole of the molds and the formation of the window frame. According to this configuration, the window frame 14' has a floating island of a certain kind which is supported by the lead connecting pieces 19a at both the sides, and hence the solder 25 inside the frame is perfectly unaffected by the outside.

FIGS. 23(A) and 23(B) show another embodiment of the structure for relaxing stress. FIG. 23(B) is a section view taken along the line X—X of FIG. 23(A).

A window frame 14" is pre-inserted aside from the primary molding (see FIGS. 9 and 10) of the harness 34 for a plate.

The pre-insert may be previously prepared by using the voltage-detection terminal unit 17 having the device mounting portion 19. Therefore, the primary molding (main insert) may be performed by using the window frame 14".

According to this configuration, an interface 59 is formed between the resin portion (the window frame 14") of the pre-insert and that (the primary molded resin board 11B, 11C) of the main insert. Even when bending stress or the like is applied, therefore, a gap is formed in the portion and the propagation of the stress is suppressed. The resin materials of the pre-insert and the main insert may be identical with or different from each other. From the view point of enhancement of the suppression effect, it is preferable to use different materials.

FIGS. 24(A) to 24(C) show another embodiment of the structure for relaxing stress. FIG. 24(A) is a perspective view of a voltage-detection terminal unit, FIG. 24(B) is a section view showing a state of attaching the terminal to the window frame 14' of FIG. 22(A), and FIG. 24(C) is a section view showing a state of attaching the terminal to the window frame 14" of FIG. 22(B).

The voltage-detection terminal unit 17' shown in FIG. 24(A) is different from the voltage-detection terminal unit 17 in that a second connection piece 18d' which is upward cranked is disposed between the device mounting portion 19 and the wire connecting portion 20, and that, as a result of this disposition, the center axis of the wire connecting portion 20 is in a plane which is substantially flush with the overlap contact portion 18.

As shown in FIG. 24(B), the bent portion serving as the second connection piece 18d' is located in the slit 58 in the outer periphery of the window frame 14'. Alternatively, as shown in FIG. 24(C), the bent portion is located at the interface 59 between the window frame 14' of the pre-insert and the primary molded resin board 11B and the like of the main insert.

In the case of FIG. 24(B), the existence of the slit 58 and the bent portion surely blocks the transmission of stress to the lead connecting piece 19a in the window frame 14'.

In the case of FIG. 24(C), the window frame 14" of the pre-insert can be moved (or slid) together with the fuse 21 inside the frame, and this portion can similarly block the transmission of stress.

What is claimed is:

1. A connecting plate for a battery holder, comprising:
    a bus bar connecting a plurality of batteries;
    a voltage-detection terminal unit, through which voltage of at least a desired one of the batteries is detected, connected to the bus bar, the voltage-detection terminal unit which includes:
        an overlap contact portion which is opposed to the bus bar,
        an electric wire connecting portion to which an electric wire is connected, and
        a device mounting portion formed between the overlap contact portion and the electric wire connecting portion;
    a molded resin board to which the bus bar and the voltage-detection terminal unit are integrally fixed, the molded resin board including a device mounting window through which the device mounting portion is exposed to exterior; and
    a circuit protecting device attachable onto the device mounting portion through the device mounting window.

2. The connecting plate of claim 1, further comprising a slit formed at a circumference of the device mounting window which is formed in the molded resin board.

3. The connecting plate of claim 2, wherein the voltage-detection terminal unit further includes a connection piece formed between the overlap contact portion and the device mounting portion so as to be bent, the connection piece being located in the slit.

4. The connecting plate of claim 3, wherein the connection piece is located in an interface portion between the slit and the molded resin board.

5. The connecting plate of claim 1, further comprising a window frame formed around the device mounting window to support the device mounting portion.

6. The connecting plate of claim 5, wherein the window frame is insert-molded aside from the molded resin board.

7. The connecting plate of claim 5, wherein the voltage-detection terminal unit further includes a connection piece formed between the overlap contact portion and the device mounting portion so as to be bent, the connection piece being located in an interface portion between the window frame and the molded resin board.

8. The connecting plate of claim 1, further comprising a window frame formed to define the device mounting window.

9. The connecting plate of claim 8, further comprising a slit formed at a circumference of the window frame.

* * * * *